US008417029B2

(12) United States Patent  (10) Patent No.: US 8,417,029 B2
Ishida et al.  (45) Date of Patent: Apr. 9, 2013

(54) IMAGE PROCESSING APPARATUS AND METHOD, INCLUDING FILL-UP PROCESSING

(75) Inventors: Yoshihiro Ishida, Yokohama (JP); Tomotoshi Kanatsu, Tokyo (JP); Taeko Yamazaki, Kawasaki (JP); Naoki Ito, Tokyo (JP)

(73) Assignee: Canon Kabushiki Kaisha (JP)

( * ) Notice: Subject to any disclaimer, the term of this patent is extended or adjusted under 35 U.S.C. 154(b) by 960 days.

(21) Appl. No.: 12/489,986

(22) Filed: Jun. 23, 2009

(65) Prior Publication Data

US 2009/0324065 A1  Dec. 31, 2009

(30) Foreign Application Priority Data

Jun. 26, 2008  (JP) .................................. 2008-167877
May 14, 2009  (JP) .................................. 2009-118040

(51) Int. Cl.
*G06K 9/00*  (2006.01)
*G06K 9/36*  (2006.01)
(52) U.S. Cl.
USPC .......................................... 382/166; 382/167
(58) Field of Classification Search .................. 382/162, 382/164, 166, 167, 266
See application file for complete search history.

(56) References Cited

U.S. PATENT DOCUMENTS

| 5,933,249 | A | 8/1999 | Shimura et al. | |
| 6,724,933 | B1* | 4/2004 | Lin et al. | 382/164 |
| 7,391,917 | B2 | 6/2008 | Ohta et al. | |
| 2003/0072487 | A1* | 4/2003 | Fan et al. | 382/176 |
| 2005/0058359 | A1* | 3/2005 | Tashman | 382/243 |
| 2005/0180645 | A1 | 8/2005 | Hasegawa et al. | |
| 2006/0072831 | A1* | 4/2006 | Pallister | 382/232 |
| 2007/0025617 | A1 | 2/2007 | Dai et al. | |
| 2007/0230810 | A1* | 10/2007 | Kanatsu | 382/243 |
| 2007/0262992 | A1 | 11/2007 | Ito | |
| 2007/0286478 | A1* | 12/2007 | Kishi | 382/162 |
| 2008/0123741 | A1* | 5/2008 | Li et al. | 375/240.12 |

FOREIGN PATENT DOCUMENTS

| JP | 07-236062 A | 9/1995 |
| JP | 2004-128881 A | 4/2004 |
| JP | 2004-265384 A | 9/2004 |
| JP | 2005-012768 A | 1/2005 |
| JP | 2006-344069 A | 12/2006 |
| JP | 2007-305034 A | 11/2007 |

OTHER PUBLICATIONS

Bertalmio et al. ("Image Inpainting," SIGGRAPH'00 Proceedings of the 27th annual conference on computer graphics and interactive techniques, (2000), pp. 417-424.*
U.S. Appl. No. 12/432,261, filed Apr. 29, 2009.

* cited by examiner

*Primary Examiner* — Yubin Hung
(74) *Attorney, Agent, or Firm* — Rossi, Kimms & McDowell LLP

(57) ABSTRACT

An image in which at least one color component among a plurality of color components in an input color image has a resolution lower than that of the other color components is held as a base image. A rectangular region that includes an object image is extracted, a region of the object image and a region of a background image are specified in the rectangular region, and fill-up processing of the specified object image is executed in the base image. Fill-up processing executed at a boundary between the object image and the base image differs from fill-up processing executed at a boundary between the object image and the background image.

10 Claims, 19 Drawing Sheets

F I G. 2
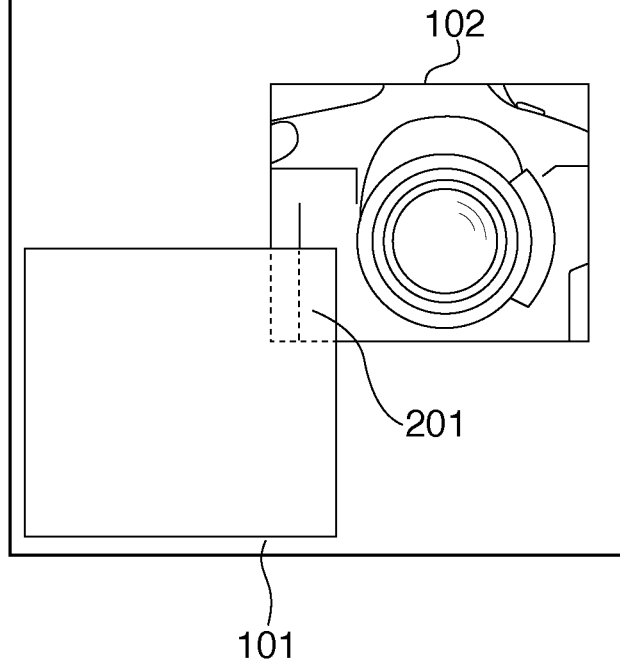

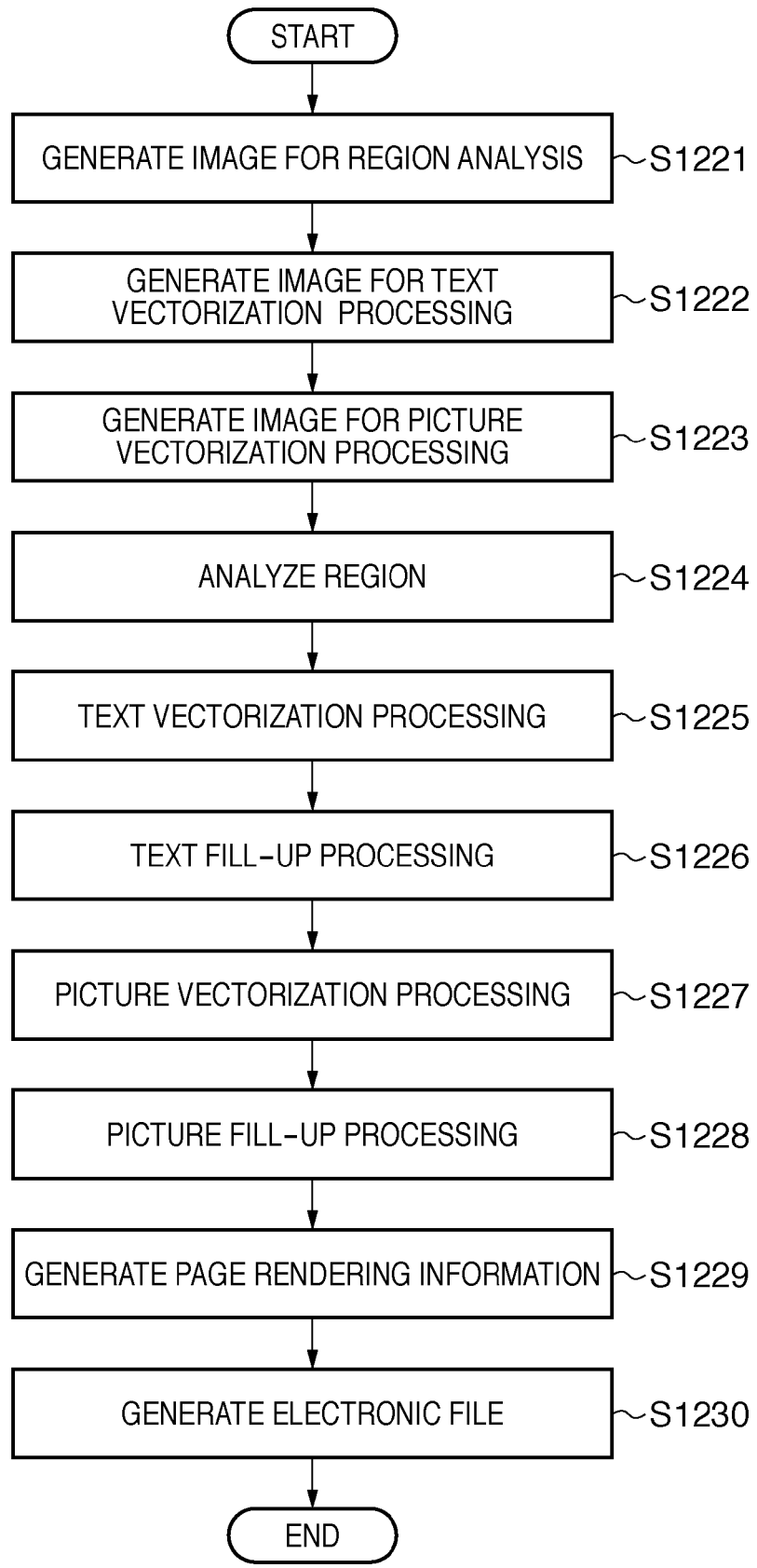

FIG. 18

```
<Document>
 <Page>
  <Image x="0" y="0" width="2480" height="3520"
   xlink:href="data:image/jpeg;base64, 9jaskjsdhk463oeSDXq32x3
XS234DXSnlu34xDXNHLNL..."/>                                    ⎫ 2111

<Image x="1472" y="358" width="556" height="603"
xlink:href="data:image/jpeg;base64, /9j4AAQSKZJasdsDqQDACA2EQFDS
Kj3hawhhd4425FRgAB..."/>                                       ⎫ 2112
  ..
  <Vector x="447" y="631" width="328" height="429" >
   <Path c="#642312" d="M0 0 10.5 0.512 111 115 2.511 1vll-6.0 1h-
5.0vll...1-1.0 0.5z"/>                                         ⎫ 2113
  </Vector>
  ..
  <Vector c="#000000" x="494" y="774" width="32" height="40">
   <Path d="M0 0 h5vll-1.0 1h-1.0vll-1.0...7h8v-6.0h-8.0z"/>
  </Vector>                                                    ⎫ 2114
  ..
 </Page>
</Document>
```

2110

IMAGE PROCESSING APPARATUS AND METHOD, INCLUDING FILL-UP PROCESSING

BACKGROUND OF THE INVENTION

1. Field of the Invention

The present invention relates to an image processing apparatus and method.

2. Description of the Related Art

With the progress that has been made in the digitization of information in recent years, there has been a proliferation of systems in which paper documents, rather than being archived in paper form, are scanned in as by a scanner and stored in electronic form or transmitted to another apparatus in the form of electronic data. In order to reduce transmission cost, a high degree of data compression is required for documents in electronic form. Also required, on the other hand, are the ability to partially edit electronic data and high image quality that will not decline regardless of whether the data is enlarged or reduced in size.

There are certain problems, however. Specifically, in a case where a document image contains a mixture of text and photographic regions, image quality is good but compression rate declines if compression suited to a text region is applied, whereas compression rate is high but text is degraded if compression suited to a photographic region is applied. Accordingly, in a technique proposed heretofore, a document image in electronic form is separated into text and photographic regions, the text region is subjected to compression suited to the text region, the photographic region is subjected to compression suited to the photographic region after text pixels are filled in with pixel values of surrounding pixels, and the compressed text image and background image are output together (e.g., see the specifications of Japanese Patent Laid-Open Nos. 07-236062 and 2005-012768).

In another proposed technique, a text region in which excellent reutilization and high image quality are important is converted to vector data, other regions such as photographic regions that do not readily lend themselves to reproduction by vectorization are compressed according to the JPEG standard, and the results of compressing these regions are combined and output, thereby realizing high compression, excellent reutilization and high image quality of document images (e.g., see the specification of Japanese Patent Laid-Open No. 2004-265384).

In a further proposed technique, targets of vector processing are expanded beyond just text and line drawings to thereby improve the ability to compress and reutilize document images and raise the image quality thereof (e.g., see the specification of Japanese Patent Laid-Open No. 2006-344069). This technique vectorizes specific images (e.g., illustrations) characterized by an object outline (object boundary) that is clearer and colors more limited in comparison with a natural image such as a photograph. Such a specific image is referred to as a "clipart image".

Further, in the specification of Japanese Patent Laid-Open No. 2007-305034, regions capable of being vectorized in a document image containing text regions are vectorized and the result of vectorization is placed in a vector layer. Vectorized regions are filled in with the neighboring background pixel values, the image obtained by such filling is subjected to JPEG compression and the result of compression is placed in a JPEG layer. In this way a document file comprising the vector-layer data and the JPEG-layer data is created.

Further, the specification of Japanese Patent Laid-Open No. 2004-128881 proposes a method in which a binary image having the original resolution and a multi-valued image having half the original resolution are generated from an input image, the binary image is subjected to separation processing and text-region conversion processing, and the multi-valued image is subjected to background-region conversion processing. For example, in a case where the input image is size A4 and consists of about 24 MB of data at 24 pits per pixel, the binary image obtained by binarizing the input image will consist of about 1 MB of data, and the image obtained by halving the resolution of the input image will consist of about 6 MB of data. By discarding the original input image after these two images are generated, digitization processing can be executed using an image memory of approximately one-fourth the size.

It is conceivable that the problem set forth below will arise in a case where a clipart region is defined by a rectangular area, the clipart region in a document image is vectorized and then fill-up is performed using the surrounding pixel values.

By way of example, when a clipart region (illustration region) 101 of the kind shown in FIG. 1 is represented by a rectangle, there are instances where another region (photographic region 102) overlaps the background portion of the clipart region. If the entire rectangular clipart region 101 is filled in with the surrounding pixel values, another region 201 that overlaps the clipart region 101 vanishes owing to such fill-up, as illustrated in FIG. 2. At the time of image reproduction, the image of the photographic region 102 cannot be reproduced. For this problem, the present applicant considers a method as below, the method being proposed in the specification of U.S. patent application Ser. No. 12/432,261. In this method, the entire rectangle of the clipart region 101 is not filled in. Rather, the region within the clipart region 101 is divided into a background region and an area other than background [i.e., an object region (the illustration proper) that constitutes foreground]. Then, only the region other than the background [namely the object region (foreground region)] is filled in.

In accordance with this method, a synthesized document file having a high compressibility can be generated and the original image can be reproduced also in a case where a region overlapping the periphery exists.

In the example of the document image shown in FIG. 1, fill-up processing is applied only to the object region (the illustration proper) contained in the clipart region 101, as shown in FIG. 3. That is, the region of the clipart region 101 other than background (namely the object region) is filled in. As a result, the overlapping portion of the photograph is entirely unaffected.

In this example, the document image that includes the clipart region 101 is input, the document image thus input is converted to binary image data and the clipart region is extracted by executing region separation processing which, using the binary image data, separates the image into various types of regions such as text, graphics and tables. Furthermore, on the basis of the color of the document image corresponding to the clipart region, the clipart region is segmented into a plurality of regions based upon degree of color similarity. Based upon the results of such region segmentation, a region that should be construed as the background region is specified within the clipart region. Then, in this document image, the color information in the region to be construed as background is adopted as the background color and the object region (the region other than background) within the clipart region is filled in with the background color. On the other hand, the image of the object region within the clipart region is converted to vector data of the clipart. The document image that results from filling in the object region (the region other than background) is subjected to JPEG compression as a base image and the JPEG data of the compressed base image is output in a file format in which the vector data of the clipart region is rendered on the base image.

Thus, in the proposed document image processing method, even in a document image that has a clipart region and another overlapping region, the other region that overlaps the clipart region will not vanish owing to fill-up. Further, it is possible to reproduce the original image and improve compressibility, reutilization and image quality.

On the other hand, in a case where an image processing apparatus is equipped with such processing, a large memory is required if the base image to be filled in is stored as is. This raises the cost of the apparatus. In the present invention, therefore, an image of interest is processed upon converting the color image format in RGB color space obtained by optoelectronic scanning that is based upon the three primary colors of the scanner. For example, a conversion is made to a format expressed in color space divided into a brightness component (Y) and color components (Cr, Cb) as in the manner of well-known YCrCb color space. In order to apply vectorization processing to an input image the size of which is large in comparison with the limitation in memory capacity permitted by the system, the resolution of the base image is lowered. For example, when the brightness component and color components of the input image have a ratio indicated by Y:Cr:Cb=4:4:4, the resolution of the color components (Cr, Cb) of the base image is halved. As a result, a conversion is made in such a manner that the ratio of the numbers of pixels becomes Y:Cr:Cb=4:1:1 so that the amount of data necessary for the base image is reduced. It should be noted that with regard to the object to undergo vectorization (an object portion of the clipart region, etc.), processing is executed at the resolution of the input image.

By adopting this expedient, a base image can be handled with half the amount of data in comparison with a case where a color image is stored, without lowering resolution, in the RGB format based upon the three primary colors. In other words, image data having twice the size can be processed. It should be noted that the reason for lowering the resolution of Cr, Cb more than the resolution of the brightness component Y is that the characteristic of the human eye is such that the eye is more sensitive to the brightness component Y than to the color components Cr, Cb.

With such an arrangement, however, there are cases where a false color based upon a difference in the resolutions of color components and fill-up color occurs at rectangular boundary portions and at background boundary portions, and this can be a factor that detracts from the image quality of the output image. It should be noted that a rectangular boundary portion is the boundary between an object that is to be vectorized and the outside of the rectangular area circumscribing the object. For example, it is the boundary between an object region within a rectangular clipart region and an base image outside the clipart region. Further, a background boundary portion is the boundary between an object to be vectorized and a background region other than the object to be vectorized inside the circumscribing rectangle. For example, it is the boundary between an object region inside a rectangular clipart region and the background region.

The cause of a false color that occurs at the above-mentioned boundary portions will be described with reference to FIGS. 4 to 6. FIG. 4 is a diagram illustrating the brightness component (Y component) of a color image, FIG. 5 is a diagram illustrating a color component (Cr component) of a color image, and FIG. 6 is a diagram illustrating a color component (Cb component) of a color image. FIG. 4 represents the Y component when the resolutions of the Cr. Cb components have been made lower than the resolution of the Y component in such a manner that Y:Cr:Cb=4:1:1 will hold. FIGS. 5 and 6 represent the Cr and Cb components, respectively, in a similar manner.

Reference numerals 401 in FIG. 4, 501 in FIG. 5 and 601 in FIG. 6 represent the Cr component and Cb component corresponding to a 2×2 pixel region at the resolution of the Y component in image data having the Y:Cr:Cb=4:1:1 format in YCrCb color space. In other words, the 2×2 pixel region (Y11,Y12,Y13,Y14) of the Y component corresponds to one pixel in the Cr component and Cb component.

Further, reference numerals 402 in FIG. 4, 502 in FIG. 5 and 602 in FIG. 6 are examples indicating the positions at which an object to be vectorized in the entered color image (original image) exists. In the case of the Y component whose resolution is the same high resolution as that of the original image, the shape of the object of interest agrees with the pixel boundary. On the other hand, in the case of the Cr component and Cb component whose resolution is half that of the original image, the shape of the object of interest does not necessarily agree with the pixel boundaries of the color components Cr, Cb. That is, there are cases where the boundary portion of the object of interest partially overlaps an area that is one-fourth or one-half of a pixel in the color components Cr, Cb.

Such color components (Cr, Cb) of the boundary portion can be unified with the color information on the object side, or they can be unified with the color information on the base image side, or the color information on the object side and the color information of the base image can be made an average color that takes into consideration the partially overlapping area ratio.

If under these conditions a conversion is made to the RGB format, which is based upon the three primary colors having the same resolution for each color, in order to display the image on a display unit or print the image by a printer, this will cause a false color to appear at the boundary portions regardless of which of the above-described methods is adopted for processing. In other words, the pixel-boundary color information is such that a color (a false color) is produced at the boundary portions that is different from the color of the color image in RGB color space obtained by opto-electronic scanning based upon the three primary colors of the original scanner. The false color results in an unnatural appearance.

There is the possibility that such false color will be occur at least at one or both boundary portions, namely the boundary portion between a background region within a clipart region and the object region (the region other than background region) and the boundary portion between the clipart region and the base region. This is illustrated in FIGS. 7A to 7G.

FIGS. 7A to 7G are diagrams useful in describing a false color that occurs at the boundary portion between a background region and an object region and at the boundary portion between an object region and a base region. FIG. 7A represents an example of a document image that contain a clipart region. Reference numerals 701 indicate the position of a clipart region that is to be vectorized. It indicates an object-circumscribing rectangle comprising a rectangle circumscribed around the clipart region. FIG. 7B represents a state in which the image within the object-circumscribing rectangle 701 has been extracted. Reference numerals 702 denote background within the clipart region (within the object-circumscribing rectangle). The background is specified as a background region from the result of segmenting the clipart region into a plurality of regions based upon degree of color similarity. The method used to specify the background region includes clustering images inside the clipart region based upon similar colors, and adopting, as a cluster of the background region, the cluster having the largest number of pixels contiguous to the boundary of the circumscribed rectangle of the clipart region. Reference numerals 704 in FIG. 7A denote the base image.

FIG. 7C excludes a background region 703 from the vectorization target and represents only a region other than background (i.e., only the object to be vectorized). It should be noted that the background color is found from the background 702 corresponding to the background region 703. Reference numerals 705 in FIG. 7C denote a boundary portion between the object region (the region other than background) and the base image 704, and reference numerals 706 denote a boundary portion between the object region (the region other than background) and the background 702. Further, FIG. 7D illustrates a region 707, which is other than background, that is to be filled in the base image. FIG. 7E illustrates a state in which both the boundary portion 705 and the boundary portion 706 have been filled in with the background color, which has been found from the background 702, without distinguishing them from the region 707 other than background.

In FIG. 7F, the object portion inside the clipart region is filled in with the background color, as illustrated in FIG. 7E, in the base image, and the result of vectorizing the object portion of the clipart region is displayed in superimposed form. The boundary portion 706 does not present a problem but there is large difference between the filled-in color (the background color) and the color of the base image at the portion corresponding to the boundary portion 705, as indicated at 708. When the vectorized object portion is displayed in superimposed form, a false color is produced owing to the difference between resolutions of the object portion and base image.

On the other hand, if both the boundary portion 705 and the boundary portion 706 are filled in not with the background color but with the base color, now a false color will not be produced in relation to the boundary portion 705 with the base image but a false color will be produced in relation to the boundary portion 706 with the background region.

A first object of the present invention is to prevent the occurrence of a false color in an object image, which is contained in a color image, and the boundary with this object image.

Furthermore, if an image used in region analysis processing (region separation processing) or vector conversion processing, etc., does not possess enough resolution and color-gamut information, etc., to maintain the accuracy of each of these types of processing, it will not be possible to generate electronic data having the advantages of high image quality and high reutilization. On the other hand, the amount of information required in each of these types of processing differs. If an image containing a large amount of information is input to all such types of processing uniformly, extra memory is consumed and processing speed slows down.

For example, in a case where a high image quality is required for a character portion in electronic data to be generated, it is necessary to input an image having a higher resolution for text-region conversion processing. For example, in order to generate vector data, which is for reproducing appearance faithfully, from an image of a small character having a point size of 3 to 5 points, an image having a high resolution on the order to 600 dpi is necessary. On the other hand, if an image for region analysis processing (in which the interior of an image is separated into a text region, a clipart region and a photographic region, etc.) has a resolution of 300 dpi, this will be sufficient. A resolution higher than this may not only invite an increase in amount of memory used and a decline in processing speed but may also lower processing accuracy because of an increase in amount of noise. Further, since it will suffice if a region can be segmented, it is more advantageous in view of raising processing speed if quantization has been performed by pre-processing so as to obtain two values locally and at most N values even for the entire image. Furthermore, with respect to processing for vectorizing a clipart region, a resolution as high as that for processing a text region is not required and an image of intermediate resolution on the order of 300 dpi is suitable. Further, in the results of vectorization, the number of bits per pixel in the input image must be made sufficiently large in order to reproduce colors that agree visually with those of the original. However, if it is so arranged that the color differences Cb, Cr have a resolution that is one-half that of luminance Y, as described above, then the size of the image data can be suppressed.

SUMMARY OF THE INVENTION

The present invention provides an apparatus that converts an input document image containing a clipart region and a text region to three images suited to respective ones of region analysis processing (region separation processing), text vectorization processing and clipart vectorization processing, and executes each of these types of processing.

In accordance with one aspect of the present invention, there is provided an image processing apparatus comprising: an image generating unit configured to generate a first image in which at least one color component among a plurality of color components in a color image has a resolution lower than that of the other color components; a holding unit configured to hold the first image, which his been generated by the image generating unit, as a base image; a region extracting unit configured to extract a rectangular region that includes an object image; a specifying unit configured to specify a region of the object image and a region of a background image in the rectangular region that has been extracted by the region extracting unit; and a fill-up unit configured to execute fill-up processing of a region, which corresponds to the object image that has been specified by the specifying unit, with regard to the base image; wherein the fill-up processing unit executes fill-up processing at a boundary between the object image and the base image that differs from fill-up processing executed at a boundary between the object image and the background image.

In accordance with another aspect of the present invention, there is provided an image processing apparatus comprising: an image generating unit configured to generate a first image in which at least one color component among a plurality of color components in a color image has a resolution lower than that of the other color components; a unit configured to lower the resolution of the color image, perform color quantization and generate a second image; a unit configured to generate a third image that is based upon luminance information of the color image; a region analyzing unit configured to subject the second image to region analysis processing; a text vectorization unit configured to subject a region, which has been analyzed to be a text region by the region analyzing unit, to vectorization processing of a text image in the third image, thereby generating vector data of the text image; a text fill-up processing unit configured to subject the first image to fill-up processing of a region corresponding to the text image that has been subjected to vectorization processing by the text vectorization unit; a picture vectorization unit configured to subject a region, which has been analyzed to be a picture region by the region analyzing unit, to vectorization processing of the picture region in the first image that has been subjected to fill-up processing by the text fill-up processing unit, thereby generating vector data of a picture; a picture fill-up processing unit configured to subject the first image, which has been subjected to fill-up processing by the text fill-up processing unit, to fill-up processing of a region corresponding to the picture region that has been subjected to vectorization processing by the picture vectorization unit; and an electronic file generating unit configured to generate an electronic file that includes the vector data of the text image generated by the text vectorization unit, the vector data of the picture generated by the picture vectorization unit, and the first image that has been subjected to fill-up processing by the text fill-up processing unit and the picture fill-up processing unit.

In accordance with still another aspect of the present invention, there is provided an image processing method comprising: a generating step of generating a first image in which at least one color component among a plurality of color components in a color image has a resolution lower than that of the other color components; a holding step of holding the first image, which has been generated at the generating step, as a base image; an extracting step of extracting a rectangular region that includes an object image; a specifying step of specifying a region of the object image and a region of a background image in the rectangular region that has been extracted at the extracting step; and a fill-up step of executing fill-up processing of a region, which corresponds to the object image that has been specified at the specifying step, with regard to the base image; wherein fill-up processing executed at a boundary between the object image and the base image differs from fill-up processing executed at a boundary between the object image and the background image.

In accordance with yet another aspect of the present invention, there is provided an image processing method comprising: a generating step of generating a first image in which at least one color component among a plurality of color components in a color image has a resolution lower than that of the other color components; a step of lowering the resolution of the color image, performing color quantization and generating a second image; a step of generating a third image that is based upon luminance information of the color image; a step of subjecting the second image to region analysis processing; a step of subjecting a region, which has been analyzed to be a text region by the region analysis processing, to vectorization processing of a text image in the third image, thereby generating vector data of the text image; a step of subjecting the first image to text fill-up processing of a region corresponding to the text image that has been subjected to vectorization processing by the text vectorization processing; a step of subjecting a region, which has been analyzed to be a picture region by the region analysis processing, to vectorization processing of the picture region in the first image that has been subjected to fill-up processing by the text fill-up processing, thereby generating vector data of a picture; a step of subjecting the first image, which has been subjected to fill-up processing by the text fill-up processing, to picture fill-up processing of a region corresponding to the picture region that has been subjected to vectorization processing by the picture vectorization processing; and a step of generating an electronic file that includes the vector data of the text image generated at the text vectorization step, the vector data of the picture generated by the picture vectorization processing, and the first image that has been subjected to fill-up processing by the text fill-up processing and the picture fill-up processing.

Further features of the present invention will become apparent from the following description of exemplary embodiments with reference to the attached drawings.

BRIEF DESCRIPTION OF THE DRAWINGS

FIG. 2 is a diagram illustrating a problem that arises in a case where a clipart region is filled in completely as a base portion and is subjected to JPEG compression;

FIG. 13 is a flowchart useful in describing processing in another embodiment;

FIG. 18 is a diagram illustrating an example of an electronic document.

DESCRIPTION OF THE EMBODIMENTS

An embodiment for practicing the invention will now be described in detail with reference to the drawings. In this embodiment, processing for filling in a region of a clipart image using an image processing apparatus will be described in detail.

Figure 8:
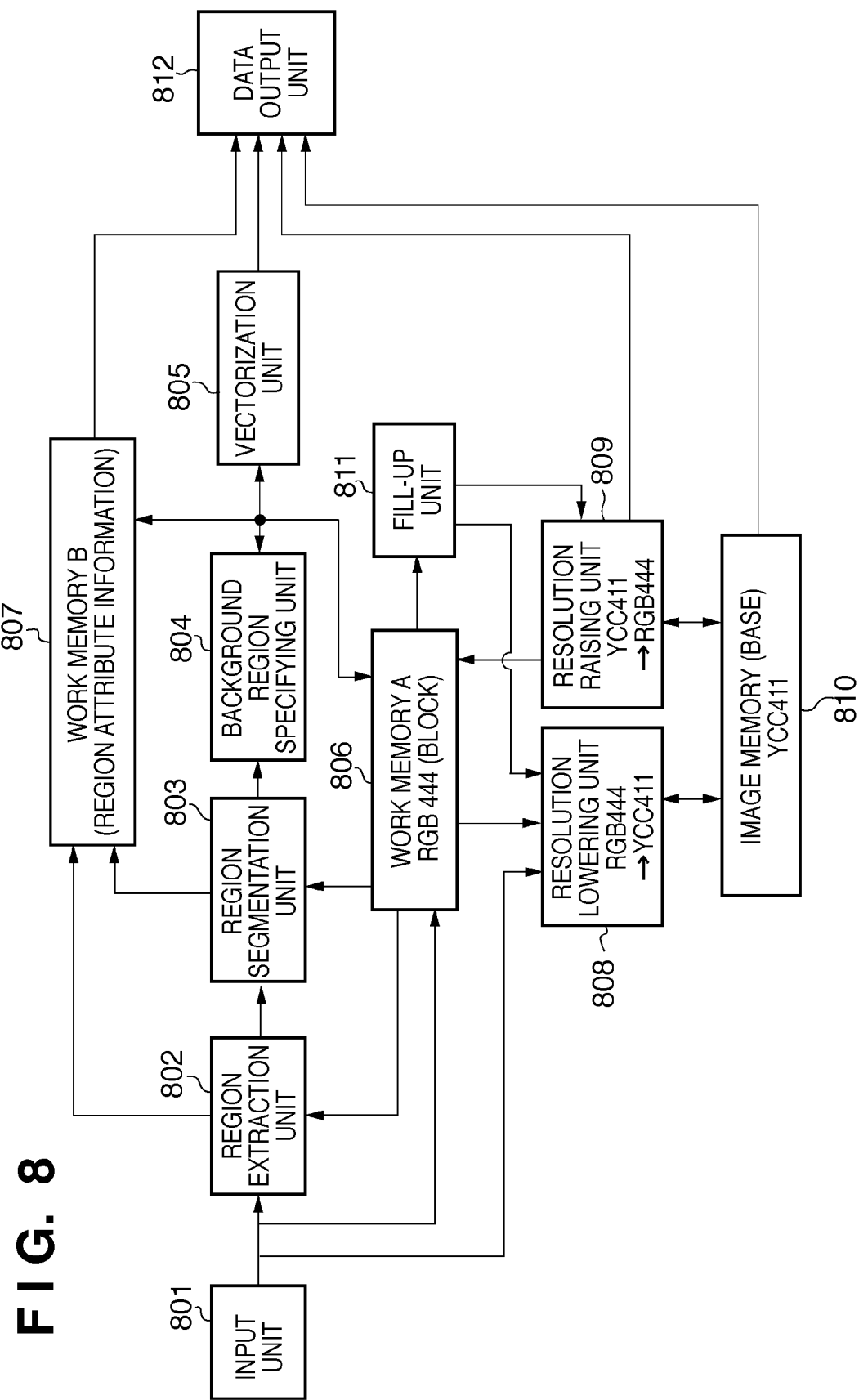
FIG. 8 is a block diagram illustrating an example of the configuration of an image processing apparatus according to an embodiment.

FIG. 8 is a block diagram illustrating an example of the configuration of an image processing apparatus according to this embodiment. An input unit 801 scans in a color image and inputs the document as input image data. A region extraction unit 802 extracts as a clipart region a region containing clipart from the input image data that has been entered from the input unit 801. For example, the input image is converted to binary image data, region separation processing is executed using this binary image data to separate the image into regions of a plurality of types such as a text region, graphics region and tabular region, and the region of the clipart image is found. The clipart image region (clipart region) found by this region separation processing is then extracted.

A region segmentation unit 803 segments the region based upon the color feature of each pixel in the clipart region extracted by region extraction unit 802. A background region specifying unit 804 specifies a background image and background color of the clipart region based upon result of region segmentation by the region segmentation unit 803. By way of example, the method used to specify the background region includes clustering images inside the clipart region based upon similar colors, and adopting, as a cluster of the background region, the cluster having the largest number of pixels contiguous to the boundary of a circumscribed rectangle of the clipart region.

A vectorization unit 805 vectorizes the portion that is other than background (the object image that will be the foreground) based upon the result of specification by the background region specifying unit 804 and the result of region segmentation by the region segmentation unit 803. A work memory (A) 806 temporarily stores the image data that is undergoing processing. A work memory (B) 807 stores various information (region attribute information) that is undergoing processing.

A resolution lowering unit 808 generates image data (a first image) in which at least one color component among a plurality of color components has a resolution lower than that of the input image data that has been input by the input unit 801. A resolution raising unit 809 restores the first image generated by the resolution lowering unit 808 to image data having a resolution equal to that of the input image data that has been input by the input unit 801.

An image memory 810 stores the first image, which has been generated by the resolution lowering unit 808, as a base image. A fill-up unit 811 executes fill-up processing for filling in an object image (inclusive of the boundary with the base image or background image) corresponding to a region (object region) that is other than the background region specified by the background region specifying unit 804.

A data output unit 812 generates and outputs image information in a file format having a layered structure that includes an object layer containing vector data vectorized by the vectorization unit 805 and an object layer of the base image that has been subjected to fill-up processing by the fill-up unit 811. For example, the data output unit 812 outputs the image information in the PDF format.

Figure 1:
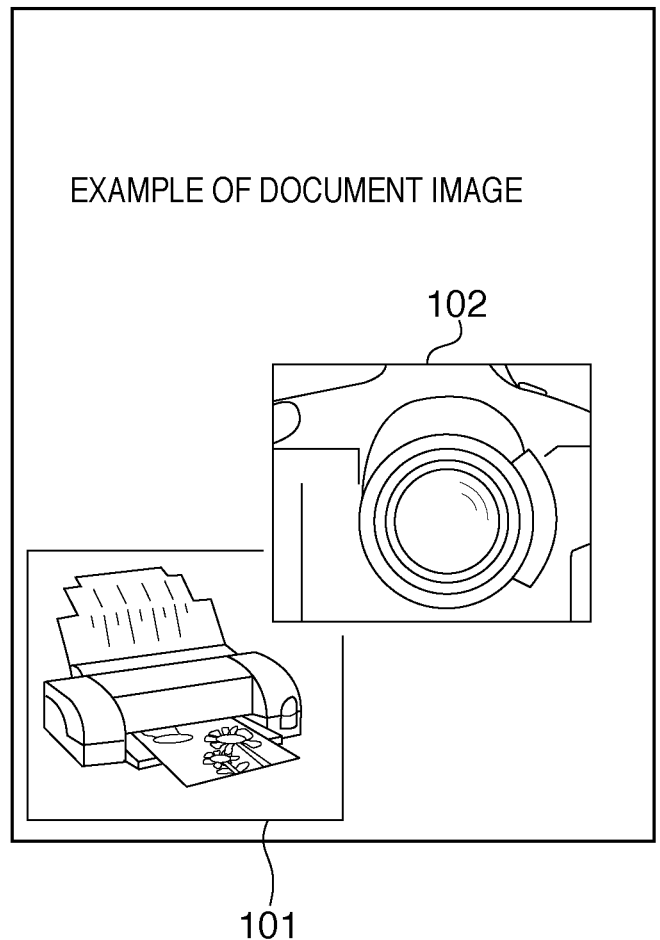
FIG. 1 is a diagram illustrating an example of a document image that contains a clipart region.
Figure 3:
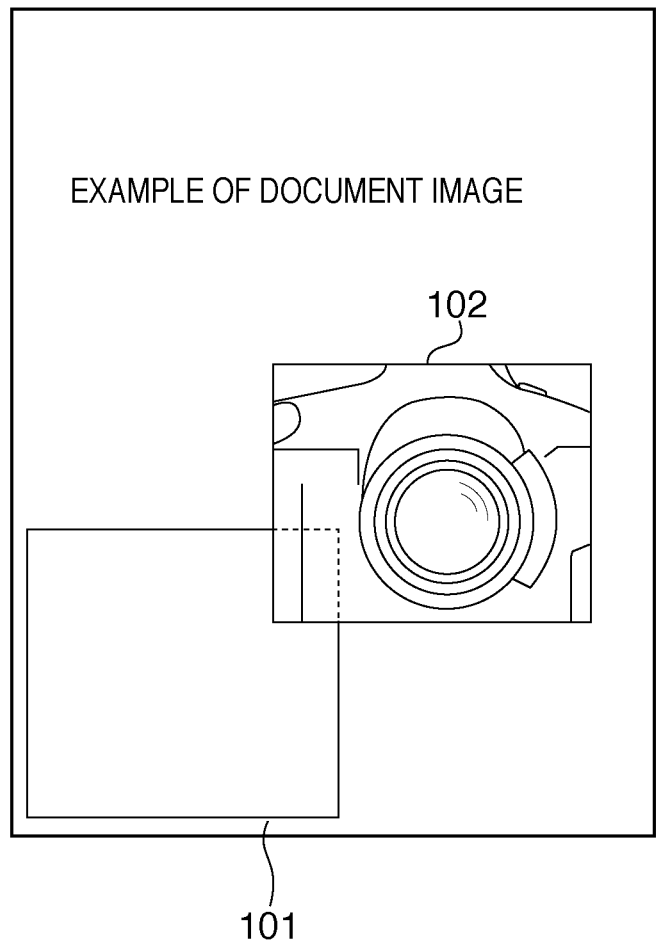
FIG. 3 is a diagram illustrating a case where a region other than background of a clipart region is filled in and a photographic region is unaffected.
Figure 9:
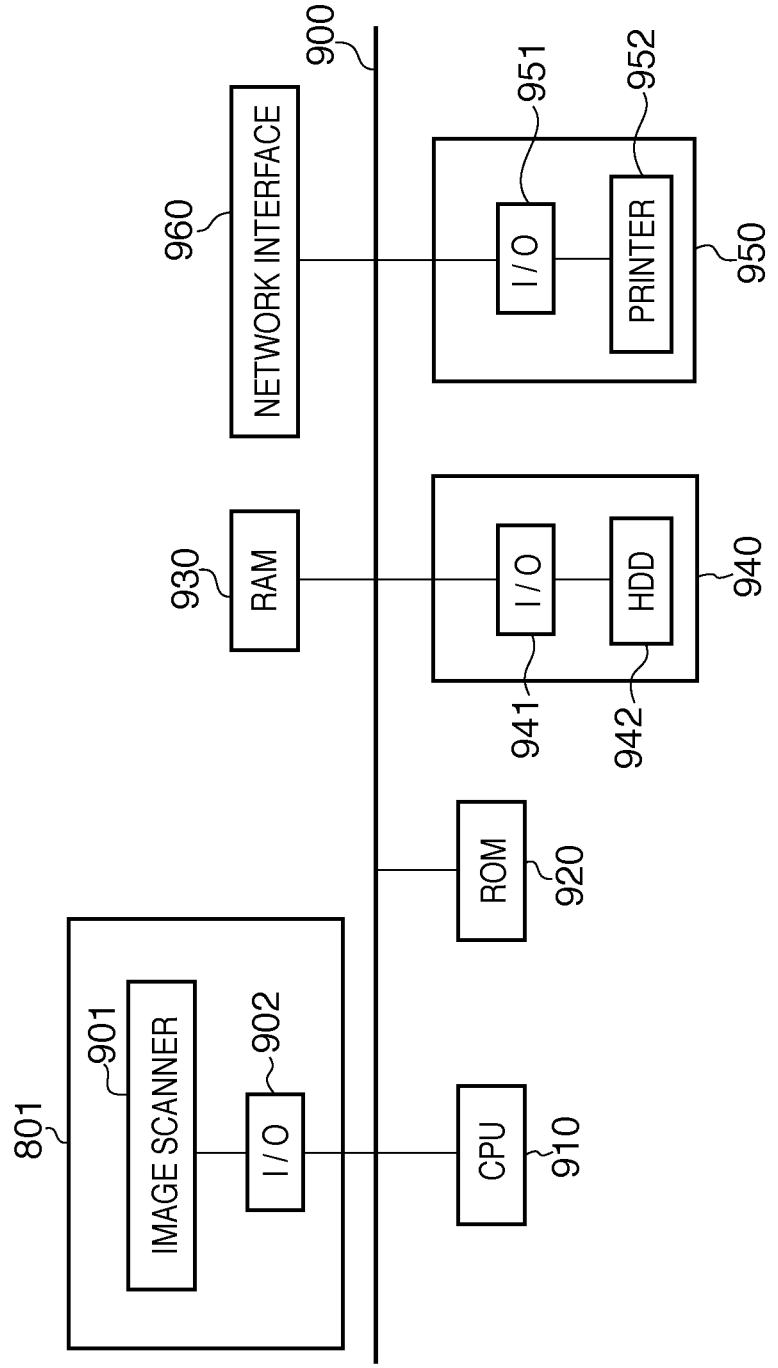
FIG. 9 is a block diagram illustrating an example of a hardware configuration for implementing an image processing apparatus according to this embodiment.

FIG. 9 is a block diagram illustrating a hardware configuration for implementing the image processing apparatus according to this embodiment. In FIG. 9, an image scanner 901 is connected to a bus 900 via an input/output (I/O) unit 902 and functions as the input unit 801 shown in FIG. 1. A CPU 910 executes a program that has been stored in a ROM 920 and thus functions as the region extraction unit 802, region segmentation unit 803, background region specifying unit 804, vectorization unit 805, resolution lowering unit 808, resolution raising unit 809, fill-up unit 811 and data output unit 812. Further, a RAM 930 functions as the work memory (A) 806, work memory (B) 807 and image memory 810.

An external storage unit 940 has a hard disk (HDD) 942 connected to the bus 900 via an input/output (I/O) unit 941. An external output unit 950 has a printer 952 connected to the bus 900 via an input/output (I/O) unit 951. The external storage unit 940, external output unit 950 and a network interface (I/F) 960 are the destinations of output data from the data output unit 812. Further, in a case where image that has been stored in the external storage unit 940 is input, the external storage unit 940 is in effect the input unit.

The fill-up processing applied to the boundary of the background region or to the rectangular boundary in the arrangement set forth above will be described with reference to FIGS. 10 and 11. Steps S1001 to S1007 shown in FIG. 10 and steps S1101 to S1109 shown in FIG. 11 are steps of processing executed by the CPU 910.

Figure 4:
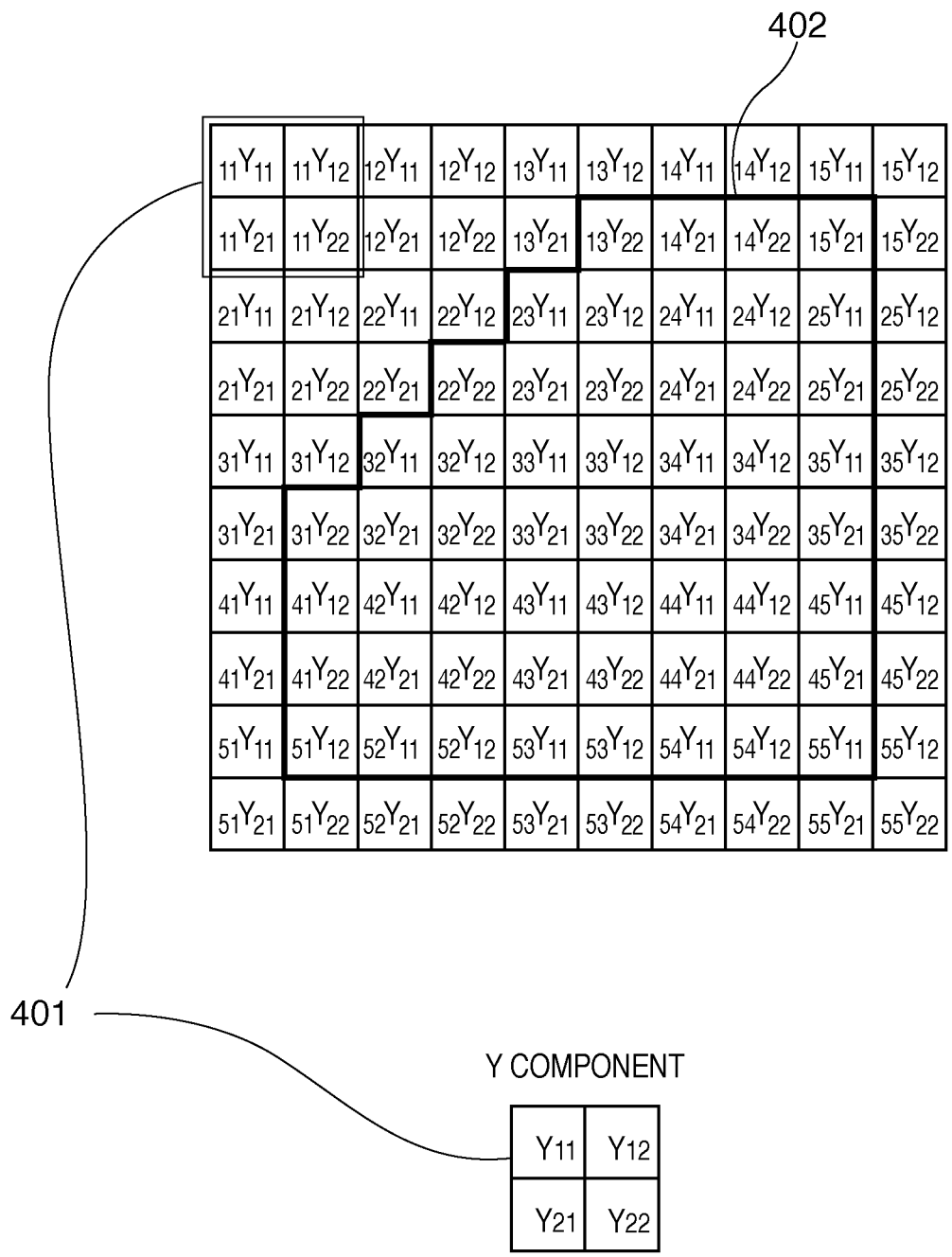
FIG. 4 is a diagram illustrating a brightness component (Y component) of a color image.
Figure 5:
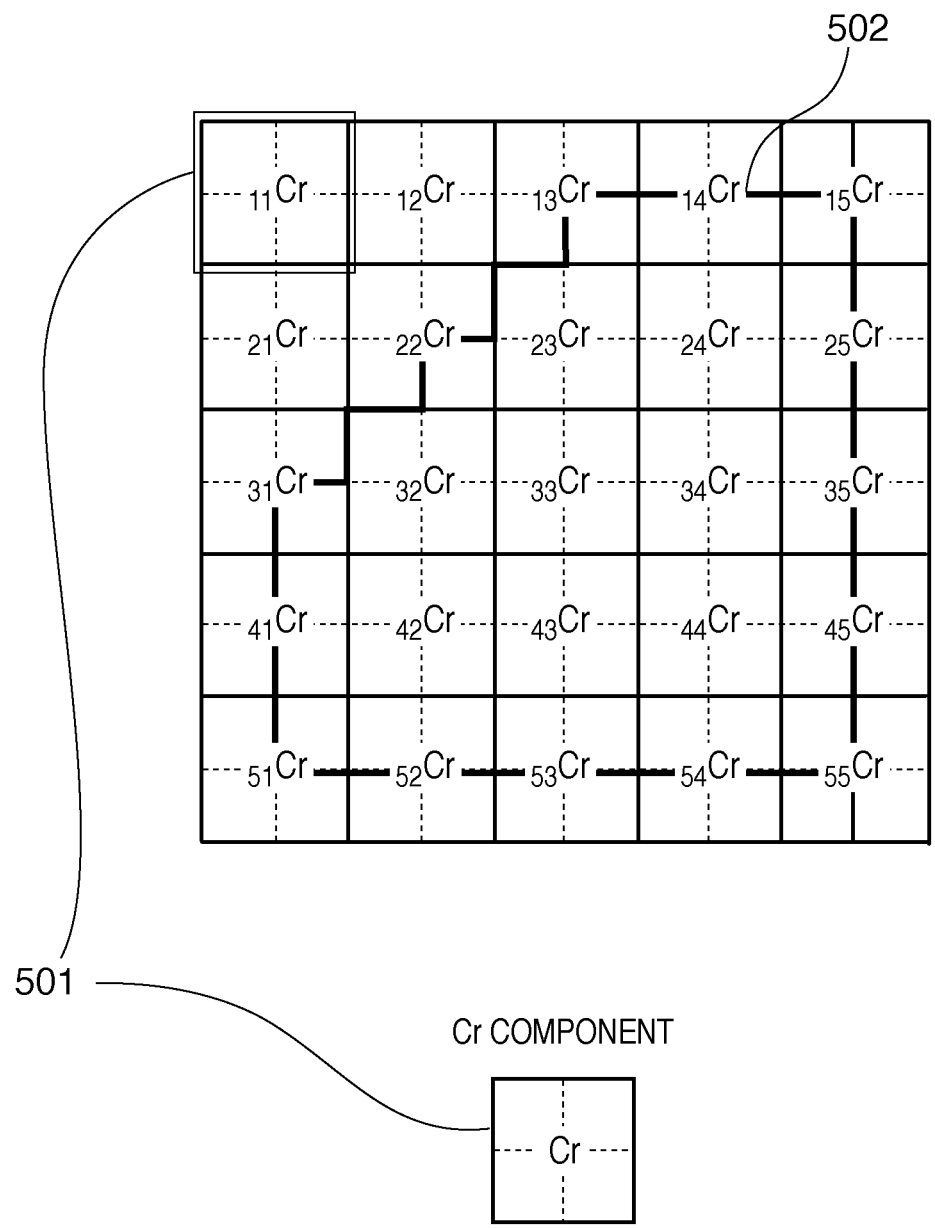
FIG. 5 is a diagram illustrating a color component (Cr component) of a color image.
Figure 6:
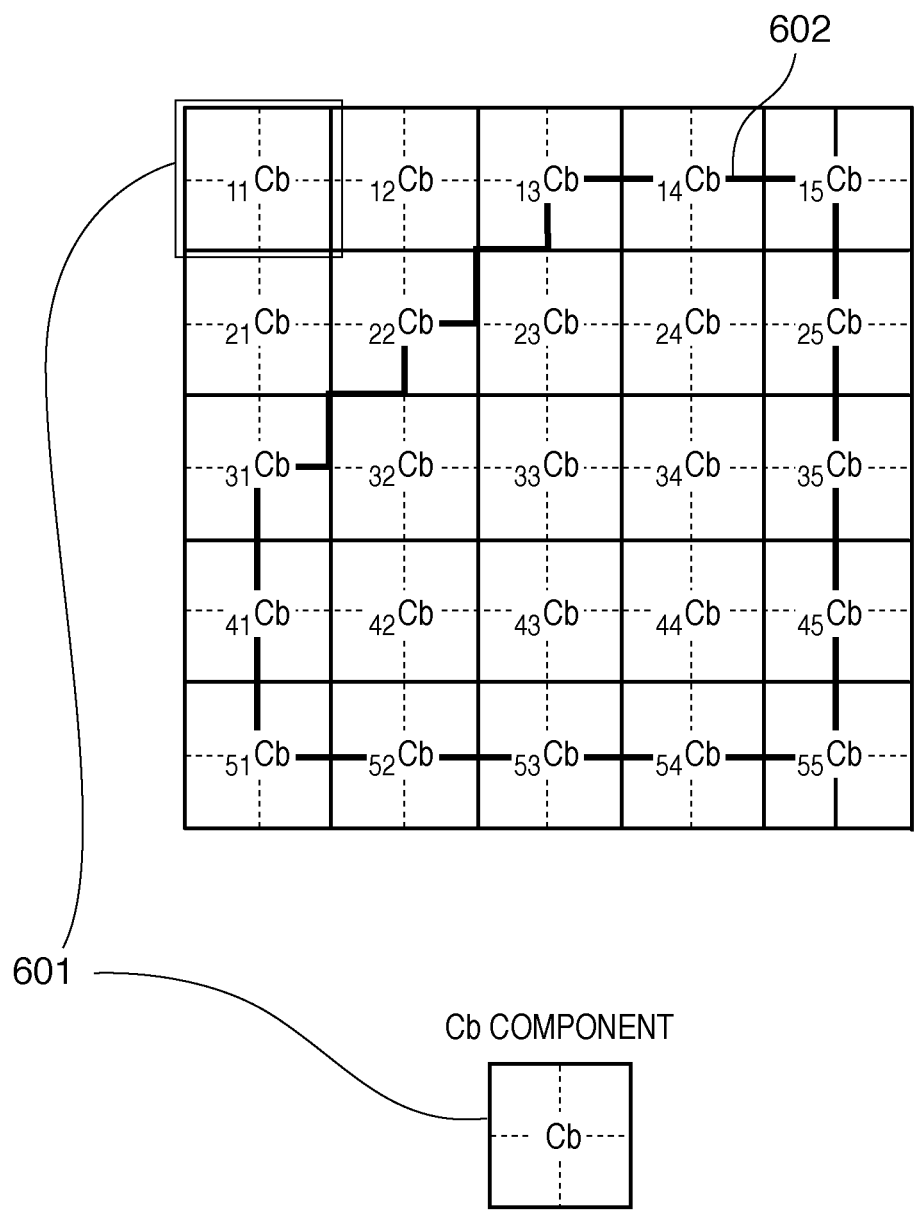
FIG. 6 is a diagram illustrating a color component (Cb component) of a color image.
Figure 10:
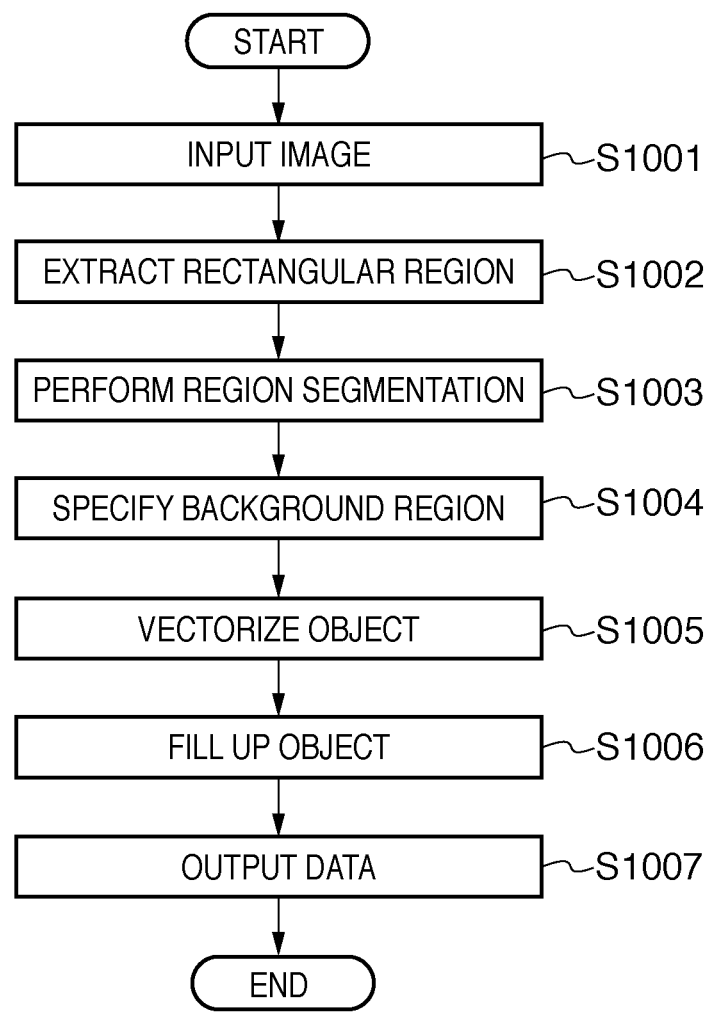
FIG. 10 is a flowchart illustrating overall image processing that includes fill-up processing in this embodiment.
Figure 11:
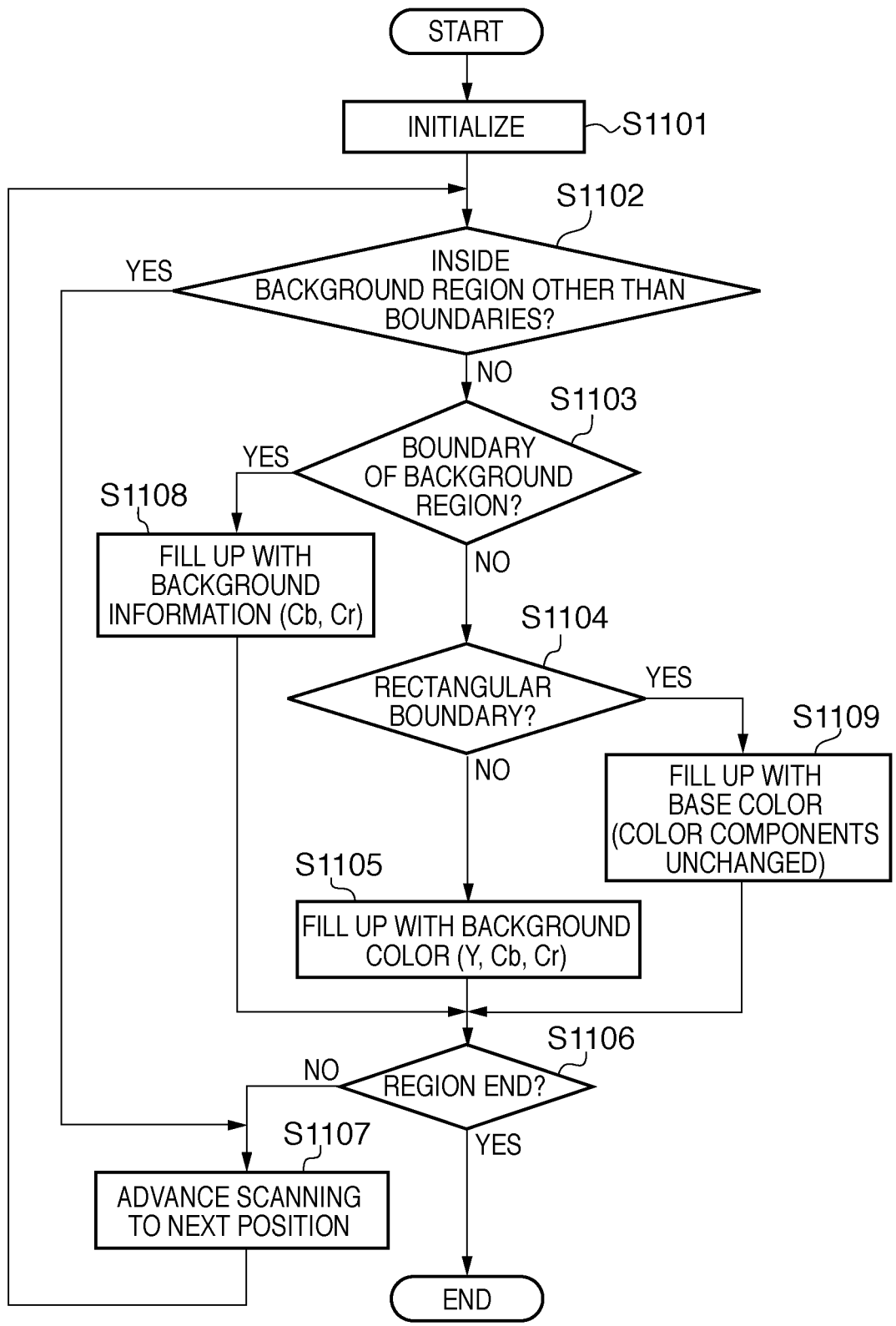
FIG. 11 is a flowchart illustrating the details of fill-up processing in this embodiment.

FIG. 10 is a flowchart illustrating overall image processing that includes fill-up processing in this embodiment. First, in S1001, the image data of the color document is input from the input unit 801. While the image data whose input is in progress is partially being buffered in the work memory (A) 806 as necessary, RGB data is sequentially lowered in resolution to the Y:Cr:Cb=4:1:1 format described with reference to FIGS. 4 to 6 and is stored in a prearranged area of the RAM 930. In this embodiment, the resolution of the Cr and Cb components is lowered.

A method of converting the data format from that of the data in RGB color space to that of the data in YCrCb color space by the resolution lowering unit 808 is a well-known conversion method and need not be described in detail here.

Next, in S1002, the image data converted to low resolution and held in the RAM 930 is stored in the work memory (A) 806 sequentially while it is partially raised in resolution to the original RGB data. The region extraction unit 802 extracts the region containing clipart from the reproduced image data as a clipart region and outputs attribute information of this region to the work memory (B) 807 in RAM 930. For example, the image is converted to a binary image, region separation processing is executed using this binary image data to separate the image into regions of a plurality of types such as a text region, graphics region and tabular region, and the clipart region is found.

It should be noted that the method of converting the data format from that of the data in YCrCb color space to that of the data in RGB color space by the resolution raising unit 809 is a well-known conversion method and need not be described in detail here.

Next, in S1003, by referring to the region attribute information of the clipart region obtained in S1002, the region segmentation unit 803 segments the region into a plurality of regions using degree of color similarity based upon the color feature of each pixel in the clipart region. That is, the image within the clipart region is clustered based upon similar colors. The result of region segmentation of the clipart region obtained is output to an area of the work memory (B) 807 in RAM 930.

Next, in S1004, the background region specifying unit 804 specifies the background region in the clipart region by referring to the result of region segmentation of the clipart region obtained in S1003. For example, the method used to specify the background region involves adopting, as a cluster of the background region, the cluster having the largest number of pixels contiguous to the boundary of the circumscribed rectangle of the clipart region. The background region information, which is information about the specified background region, and the background color information, which is color information about the background region, is output to the work memory (B) 807 of the RAM 930.

Next, in S1005, the vectorization unit 805 vectorizes the region that is other than the background inside the clipart region as an object portion based upon the background region information specified in S1004. The result of vectorization is output to the work memory (B) 807 of the RAM 930.

Next, in S1006, based upon the background region information, an image (a background mask image) in the bitmap format in which the background region and object region other than the background region can be distinguished is generated. Processing for filling in the portion corresponding to the object region in the clipart region is executed with reference being had to the background mask image in the bitmap format. The base image that has been subjected to fill-up processing is stored in a prearranged area of RAM 930 in the Y:Cr:Cb=4:1:1 format as background image data for which fill-up processing has been completed. The details of fill-up processing executed in S1006 will be described later with reference to FIG. 11.

Next, in S1007, image information having a layered structure that includes an object layer and a background image layer is output upon being generated from result of vectorizing the object portion and the background image data for which fill-up processing has been completed.

The details of fill-up processing of the object portion in S1006 in FIG. 10 will now be described with reference to FIG. 11. First, in S1101, based upon the background region inside the clipart region to be processed, information for distinguishing the background region is generated as a binary bitmap image (image for identifying background) that has been raised in resolution and generated by one bit per pixel. The background region and object region are stored in the work memory (A) 806 while the pixel values are generated in a format in which they can be discriminated as "1" or "0", and the background region information of the clipart region is read out of the work memory (B) 807. When this is done, a series of initialization processes is executed as preparation for processing the image data, which corresponds to the clipart region, in the raster scan sequence. Upon conclusion of this series of initialization processes, the fill-up processing of the portion corresponding to the clipart region is started in the raster scan sequence.

Next, in S1102, the apparatus raster-scans the Cr data (or the Cb data) of the image data that has been stored in the RAM 930 upon being lowered in resolution in the Y:Cr:Cb=4:1:1 format of the portion corresponding to the clipart region. It is determined whether pixels at positions of interest in the raster scan sequence at this time are pixels inside the background region that are neither the boundary portion 705 nor the boundary portion 706 mentioned above. More specifically, an examination is made as to whether pixels at positions of interest in the raster scan sequence at this time are pixels for which all four pixels of the 2×2 pixels of the corresponding portion (to which the region of 2×2 pixels corresponds) in the bitmap image (the image for identifying background) are pixels of the background region. If all four pixels are background pixels, it is determined that this region is a background region that is other than a boundary.

If the result of this determination is that the pixels of interest are pixels of the background region other than a boundary, then control proceeds to S1107. If the result of this determination is that the pixels of interest are not pixels of the background region other than a boundary, then control proceeds to S1103. In S1103, in a manner similar to S1102, it is determined whether the pixels of interest are pixels corresponding to the boundary portion 706 [that is, the boundary between the background region and the object region (a region other than background in the clipart region). In other words, an examination is made as to whether pixels at positions of interest in the raster scan sequence at this time are pixels for which any pixel among the four pixels of the 2×2 pixels of the corresponding portion in the bitmap image (the image for identifying background) is a pixel of the background region and all of the remaining pixels among the four pixels are pixels of the object region. If this condition is satisfied, it is determined that the pixels of interest are pixels corresponding to the boundary portion 706 (i.e., the boundary between the background region and object region).

If the result of this determination is that the pixels of interest correspond to the boundary between the background region and object region, control proceeds to S1108. If the result of this determination is that the pixels of interest do not correspond to the boundary between the background region and object region, then control proceeds to S1104. In S1104, in a manner similar to the above-described determination processing, it is determined whether the pixels of interests are pixels corresponding to the boundary portion 705 [i.e., the boundary between the base region and the object region]. In other words, an examination is made as to whether pixels at positions of interest in the raster scan sequence at this time are pixels for which any pixel among the four pixels of the 2×2 pixels of the corresponding portion (to which the region of 2×2 pixels corresponds) in the bitmap image (the image for identifying background) is a pixel of the object region and any of the remaining pixels among the four pixels is a pixel of the base region. If this condition is satisfied, it is determined that the pixels of interest are pixels corresponding to the boundary portion 705 (i.e., the boundary between the base region and object region).

If the result of this determination is that the pixels of interest correspond to the boundary between the base region and object region, control proceeds to S1109. If the result of this determination is that the pixels of interest do not correspond to the boundary between the base region and object region, then control proceeds to S1105. In S1105, fill-up is performed with the background color (Y, Cr, Cb) since this is a case where the pixels of interest are pixels in the object region (the object proper that constitutes the foreground). That is, in terms of the image data that has been lowered in resolution and stored in the RAM 930, the items of Cb data, Cr data and Y data of the pixels at the positions of interest in the raster scan sequence at this time are replaced with values obtained from the background color data. Since the background color data is being held as RGB data, it is obtained by converting the RGB data to YCrCb.

Next, in S1106, it is determined whether the processing in the raster scan sequence of the image data corresponding to the clipart region has advanced up to the final pixel of this region. If the result of the determination is that processing has ended at the final pixel, then this series of processing operations is exited. Otherwise, control proceeds to S1107. In S1107, the pixel at the position of interest (the pixel of interest) is advanced to the pixel at the next position and control returns to S1102.

Figure 7A:
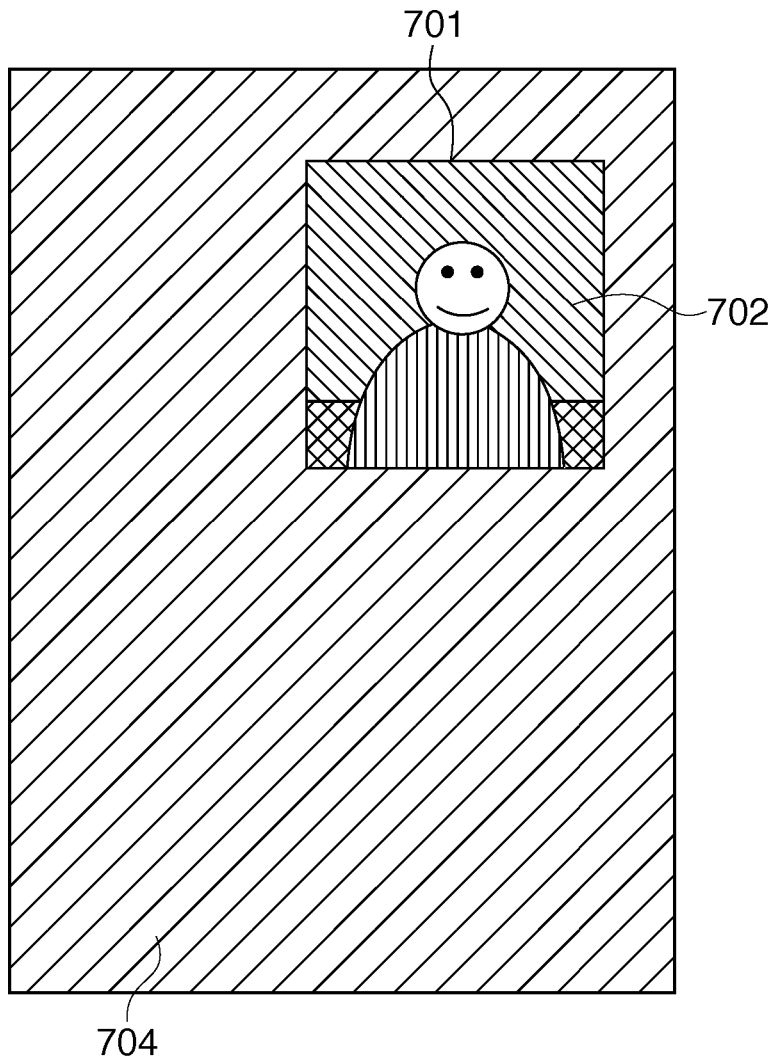
FIGS. 7A to 7G are diagrams useful in describing a false color that occurs at the boundary portion between a background region and a region other than the background region and at the boundary portion between a clipart region and a base region.
Figure 7B:
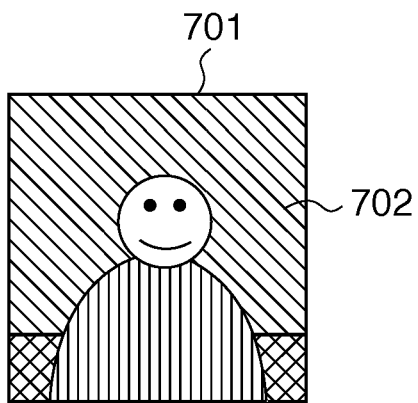
Figure 7C:
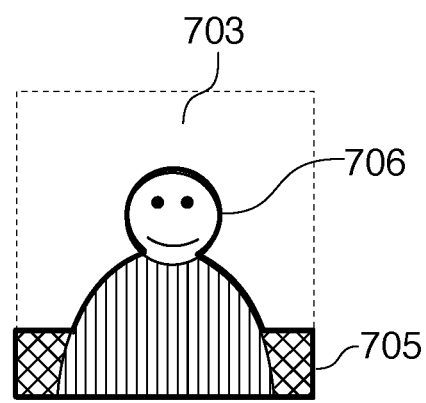
Figure 7D:
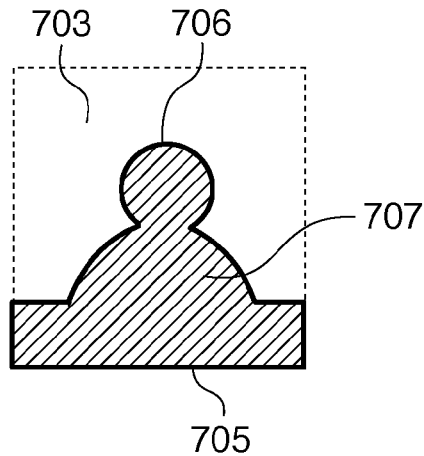
Figure 7E:
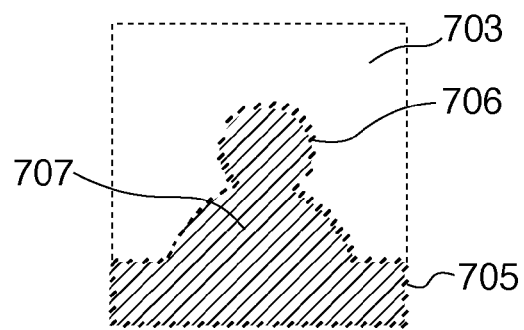
Figure 7F:
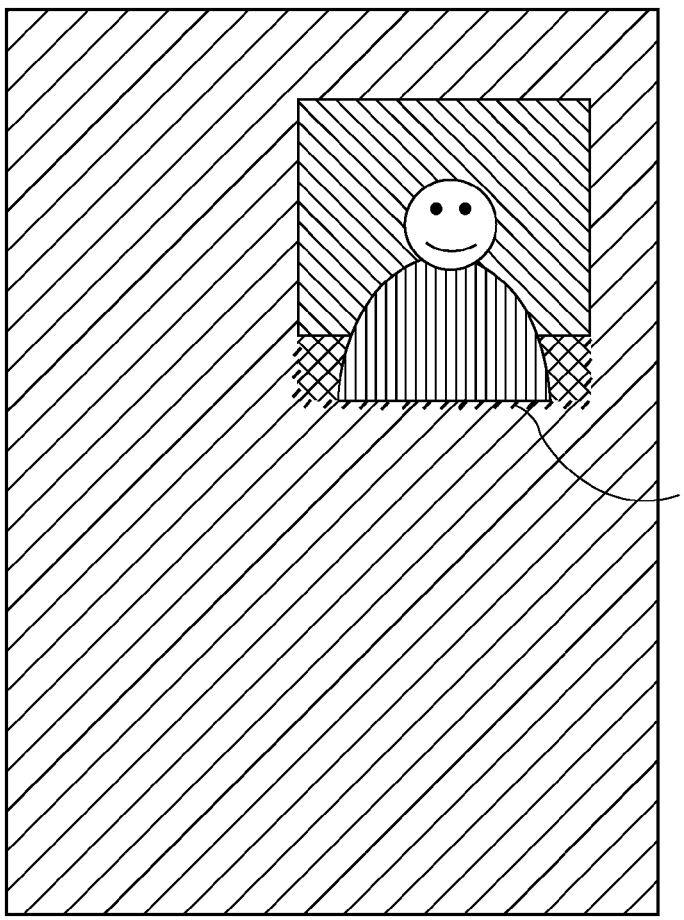
Figure 7G:
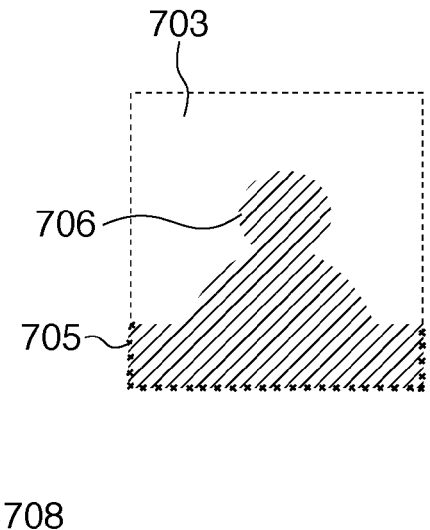

On the other hand, in S1108, since the pixels of interest are pixels corresponding to the boundary portion 706 (i.e., the boundary between the background region and the object region), only Cb and Cr of the pixels of interest are replaced with values obtained from the background color data. That is, the boundary portion 706 is filled in with the background color data, as illustrated in FIG. 7G. Since the background color data is being held as RGB data, it is obtained by converting the RGB data to YCrCb. When the processing of S1108 ends, control proceeds to S1106.

On the other hand, in step S1109, since the pixels of interest are pixels corresponding to the boundary portion 705 (i.e., the boundary between the base region and the object region), Y, Cb, Cr of the pixels of interest remain with their values unchanged and they are not replaced with the data of the background color. That is, the boundary portion 705 is filled in with colors of the base region, as illustrated in FIG. 7G. When the processing of S1109 ends, control proceeds to S1106.

In accordance with this embodiment, a false color does not occur at boundary portions even in a case where an object to be vectorized in a page of a color document and the background outside a circumscribing rectangular region that contains this object consist of data having different resolutions. The boundary portions are a rectangular boundary portion between the object to be vectorized and the outside of a circumscribing rectangular region that contains this object, and a boundary portion between the object to be vectorized and a background region other than the object to be vectorized inside the circumscribing rectangle.

Accordingly, even input of an image having a size that is large in comparison with the allowable memory capacity of the system can be subjected to vectorization processing without sacrificing output image quality.

In this embodiment, the conversion of an input image from an image in the RGB format to the Y:Cr:Cb=4:1:1 format is performed by software processing executed by the CPU 910 while the image is buffered in the work memory (A) 806. However, it may be so arranged that this is performed using special-purpose hardware capable of being implemented by well-known techniques. If this processing is executed using hardware, processing time can be curtailed although the cost of the apparatus will rise.

Further, this embodiment has been described on the assumption that processing is executed without storing the entire input image as an image in the RGB format. However, the invention is not limited to this arrangement. It may be so arranged that the input image is stored temporarily in an external storage device such as a hard disk as an image in the RGB format, after which the image is read out of the external storage device again and similar processing is executed.

Further, this embodiment has been described on the assumption that the input image is processed as a document image read in by a scanner. However, the invention is not limited to this arrangement. Specifically, it may be so arranged that an image (a still image) captured by a digital camera or a moving image captured by a video camera is made the input image.

In the case of these input images, the JPEG standard is used if the image is a still image and the MPEG standard is used if the image is a moving image. What is input as an image in which the resolution of at least one color component among a plurality of color components is low as in the manner Y:Cr: Cb=4:1:1 is divided into a background region and a region other than the background region (i.e., an object portion) as opposed to an ordinary image. It goes without saying that the present invention is applicable even in a case where processing such as vectorization is applied to this object and then it is re-combined with the background region.

Other Embodiments

A second embodiment of the invention will now be described in detail with reference to the drawings. In the embodiment described above, processing for filling in a clipart region has been described in detail. The second embodiment set forth below describes the details of processing when this processing is applied to a clipart region and text region. The second embodiment can be implemented using the image processing apparatus having the hardware configuration shown in FIG. 9.

Figure 12:
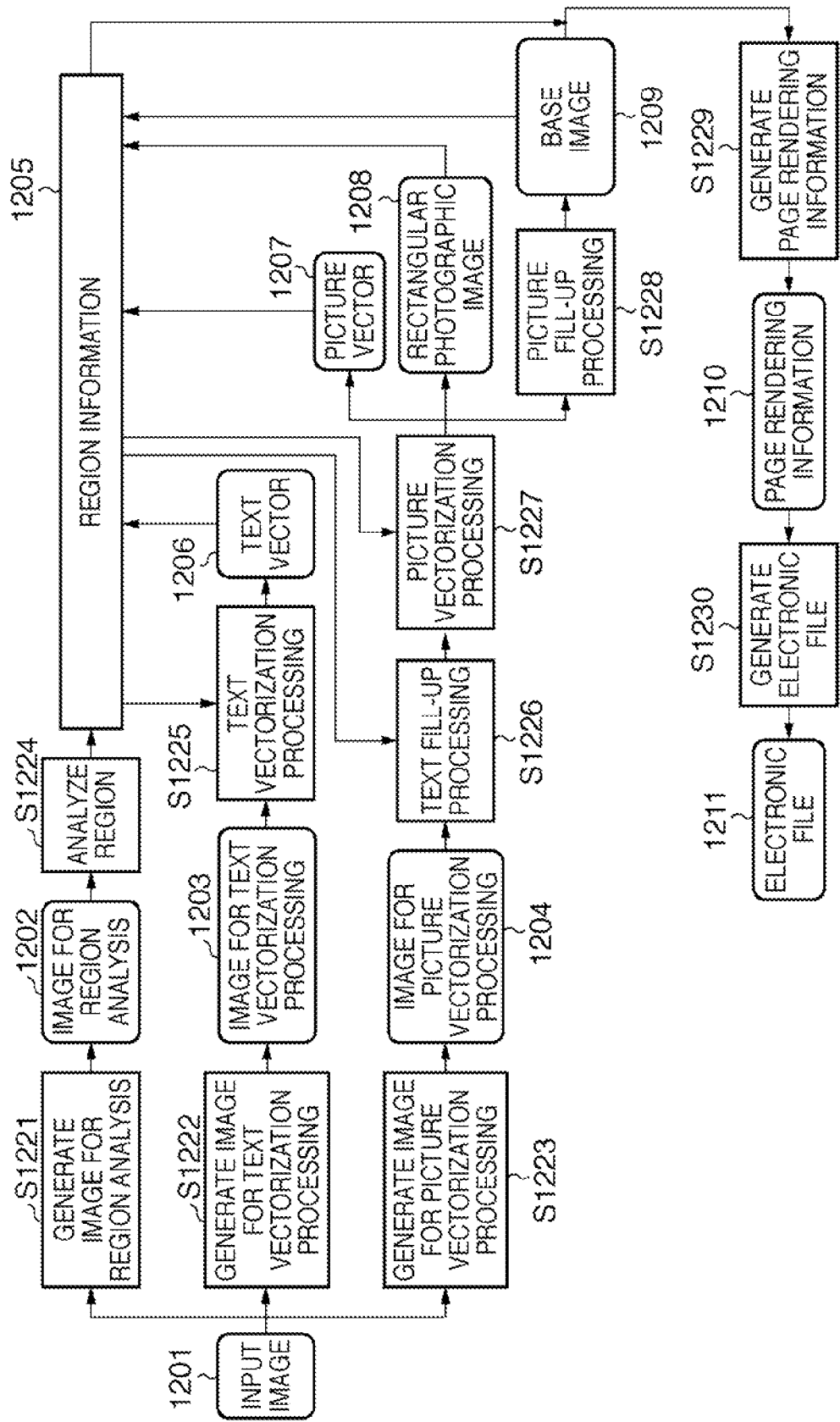
FIG. 12 is a diagram useful in describing processing in another embodiment.

FIG. 12 is a diagram useful in describing processing according to the second embodiment. Steps S1221 to S1230 represent steps at which image and other data are processed electronically. Further, reference numerals 1201 to 1211 denote data that is input at each step or data generated at each step.

It is assumed that the processing steps shown in FIG. 12 are implemented by having the CPU 910 of FIG. 9 execute a computer program. However, it may be so arranged that some or all of the processing is implemented by electrical circuits. Further, it is assumed that the processing steps are executed in the order indicated in the flowchart of FIG. 13. Each of the processing steps will now be described in detail.

The processing shown in FIG. 12 is image generation processing for converting the resolution and color space of an input image and generating an image suited to other processing. The color-space conversion and resolution conversion employ well-known methods.

Processing S1221 for generating an image for region analysis converts an input image 1201 to an image 1202 suited to region analysis processing S1224. A multi-valued image having an intermediate resolution is suitable as the image 1202, which is the image to be processed at the region analysis processing step S1224. Therefore, in step S1221 for generating an image for region analysis, the input image 1201 (e.g., an image having a resolution of 600 dpi in RGB color space) is converted to an image having a resolution of 300 dpi in YCrCb color space. This is followed by quantizing color and generating the image 1202, which is a second image for region analysis and has a fewer number of bits per pixel.

A processing step S1222 for generating an image for the purpose of text vectorization processing converts the input image 1201 to an image (a third image) suited to processing in step S1225, which is for vectorizing text. In general, the size of a character is much smaller than the size of a page. Accordingly, a high-resolution image is suitable as the image 1203, which is the image to be processed at the text vectorization step S1225. The processing step S1222 for generating an image for the purpose of text vectorization processing extracts only the luminance information Y from the input image 1201, thereby generating the image 1203 for text vectorization processing. This is a grayscale image (luminance image) having a resolution of 600 dpi.

A processing step S1223 for generating an image for the purpose of picture vectorization processing converts the input image 1201 to an image suited to processing in step S1227, which is for vectorizing a picture. In a picture region [i.e., a region of clipart (an illustration) or of a photographic image], color information is important. Accordingly, a color image having intermediate resolution is suitable as the image to be processed at the picture vectorization processing step S1227. The processing step S1223 for generating an image for the purpose of picture vectorization processing generates an image 1204, which is for picture vectorization processing, by lowering the resolution of the color components in such a manner that the ratio of resolutions of the input image 1201 will change from Y:Cr:Cb=4:4:4 to Y:Cr:Cb=4:1:1. It should be noted that the reason for lowering the resolution of Cr, Cb more than the resolution of the brightness component Y is that the characteristic of the human eye is such that the eye is more sensitive to the brightness component Y than to the color components Cr, Cb. Although the image 1204 is used also when the base image of the background is generated, there will be little influence visually even if the color-difference resolution is half the luminance resolution.

Region analysis processing (region separation processing) S1224 separates the input image into a plurality of regions by discriminating text portions and picture portions in the input image. A well-known technique for segmenting a color image into regions can be used. For example, it is possible to use the technique described in patent document WO2006/066325.

Figure 14A:
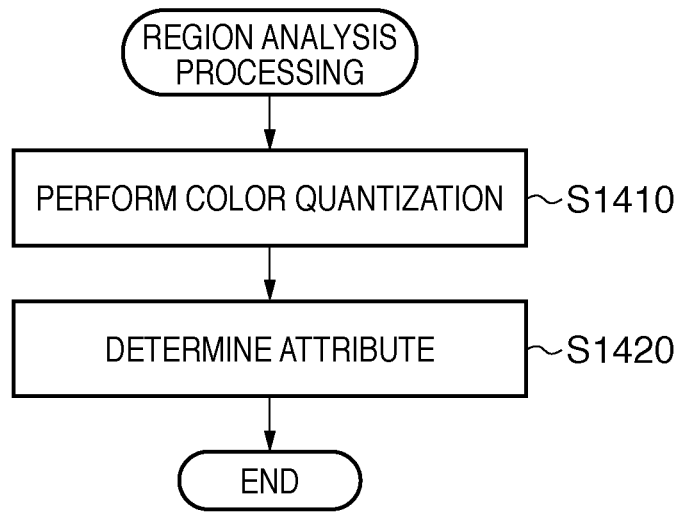
FIGS. 14A and 14B are diagrams illustrating the details of region analysis processing and attribute determination processing.

FIG. 14A is a flowchart of region analysis processing executed at the region analysis processing step S1224. At S1410, the input image is subjected to color quantization so that regions that are similar in color will be merged together. In step S1420, regions are extracted from the color-quantized image based upon the color information, and the attributes (i.e., attributes of text, pictures, page background, etc.) of the extracted regions are determined.

Figure 14B:
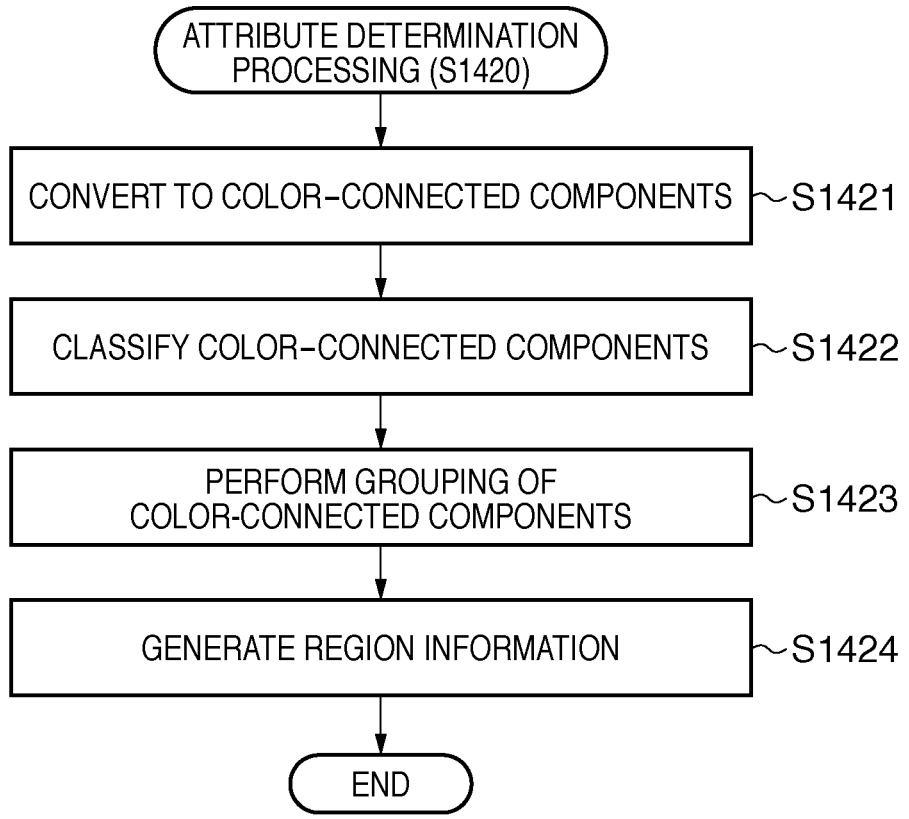

FIG. 14B illustrates the details of attribute determination processing executed in S1420. In S1421, connected components of pixels determined to be the same color are extracted from color-quantized image, whereby a conversion is made to information about the color-connected components. That is, connected components are a group of pixels that are of the same color (or similar color) and are connected (in contact). Next, in S1422, the color-connected components are subjected to attribute classification based upon statistical values of the color-connected components (a circumscribing rectangle of the color-connected components, number of pixels, boundary-line length, average color, etc.). In S1423, grouping is performed based upon a positional inclusion relation of the color-connected components, and region information 1205 is generated from the grouped connected components in S1424. The region information 1205 includes attribute information (text, line drawing, photograph, clipart (illustration), table, frame, page background, etc.] and position information regarding the regions of the connected components, and includes, as tree-structure information, the relationship among regions of connected components that have been grouped. Further, results of processing for every region executed below are recorded in the region information.

The details of text-portion vector conversion processing executed at text vectorization processing step S1225 will now be described. The position of a text region is specified based upon the region information 1205, connected components of a text image are acquired from the text region in the image 1203 for text vectorization processing, and the contour of the connected components is converted to vector data. Since the image 1203 for text vectorization processing is a high-resolution image, the contour of the connected components of the text image is obtained more accurately and highly accurate vector data is obtained. Text color (color information about the text image) is specified based upon color information of the text region obtained by region analysis processing S1224. It should be noted that a well-known technique can be used as the technique for converting the contour of connected components to vector data. One example is illustrated below.

First, in a case where a text image is a high-resolution grayscale image, binarization processing is executed, contour tracing of text pixels is performed and the contour of connected components of text are acquired. In order to express the contour of connected components of text as a combination of straight lines and/or curves, a "corner" for partitioning a pixel string, which constitutes the contour of the connected components of text, into a plurality of sections (pixel strings) is detected. Here a "corner" is the point at which curvature is maximal. The pixel string of each section demarcated by the corner is approximated by a straight line or curve. Approximation to a straight line is executed by the method of least squares, and approximation to a curve employs a three-dimensional spline function or the like. The pixel at the corner that partitions the pixel string forming the contour into sections is the starting point or end point of the approximated straight line or approximated curve. Initially, vectorization of the contour on the outer side of the connected components is performed, it is determined whether an inner contour exists in the interior of the vectorized contour and, when an inner contour exists, the pixel string forming this contour is vectorized. For example, in a case where connected pixels which are black pixels are vectorized, first the contour on the outer side of the black pixels is converted to vector data. If a white pixel exists in the interior, the contour of the boundary between the black and white pixels on the inner side is vectorized. The inner contour of the reversed pixels is then vectorized recursively. If partitioning-line approximation of the contour of the connected components is used, then the outline of the text portion can be converted to vector data.

A section in which the line width of the connected components is substantially constant is converted to vector data as follows: In a case where contour lines of connected components are close to each other in a certain section of interest and it is determined that the distance between these contour lines is substantially constant, the two contour lines are merged and can be expressed as a line having thickness. For example, the center line between the two contour lines is approximated by a straight line or curve, and the average value of the distance between the contour lines is adopted as the thickness of the approximated straight line or approximated curve. The vector data thus converted and the color information (text-color information) of the connected components are recorded in the region information as a text vector 1206.

Processing for filling in a text region is performed at a text fill-up processing step S1226. In this embodiment, a well-known method of filling in a text-pixel portion with the average color of the pixels neighboring the text pixels is used. Pixel-connected components of the text region are extracted from the region information 1205 and are expanded as an image in a text fill-up memory. The pixel position expanded in this memory and the positions of the image for picture vectorization are superimposed and specify a text pixel portion in the image 1204 for picture vectorization.

Next, the average color of the neighboring pixels of the text pixel portion specified in the image 1204 for picture vectorization is calculated. The text pixel portion specified in the image 1204 for picture vectorization is filled in with the calculated average color. As a result, the text-vectorized region is filled in with the surrounding background color and an image for vectorizing a picture that has no text is generated.

Figure 15:
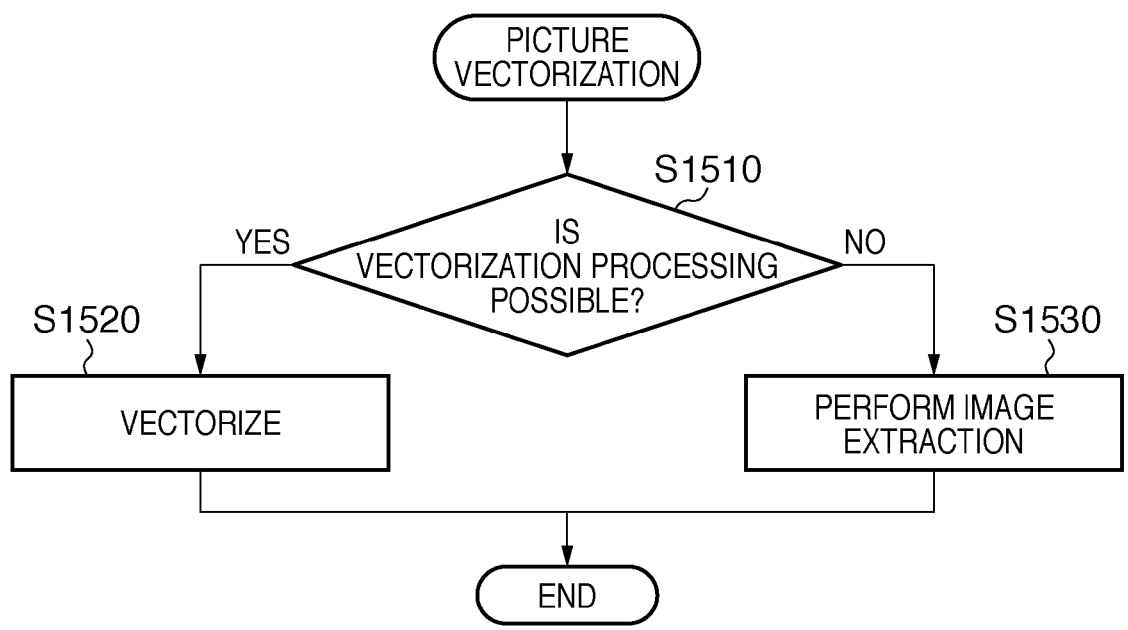
FIG. 15 is a diagram illustrating processing for vectorizing a picture.

Picture vectorization processing S1227 subjects a picture region to vector conversion. Picture vectorization processing will be described with reference to FIG. 15. In S1510, information about a picture region [photograph, clipart (illustration)] is acquired from region information 1205 and it is determined whether the image of this region can be vectorized. For example, reference is had to the attributes of the region information and it is determined that vectorization is possible if the image is clipart. However, if a region having a complicated image is adopted as the target of vectorization processing, this will involve a large amount of computation and lower processing speed. Such a region may just as well be exempted from vectorization processing. For example, if, when a clipart region is subjected to color quantization, it is determined that there will be a very large number of connected regions of various colors, it may just as well be decided that vectorization of this picture region is not possible.

If it is determined that vectorization processing is possible ("YES" in S1510), control proceeds to S1520, vectorization processing of the picture region is executed and a picture vector is generated. On the other hand, if it is determined that vectorization processing is not possible ("NO" in S1510), control proceeds to S1530 and cluster-image extraction processing is executed. In S1530, the region is cut out of the image 1204 and a rectangular photographic image is generated. A picture vector 1207 generated in S1520 or a rectangular photographic image 1208 generated in S1530 is recorded in the region information.

Figure 16:
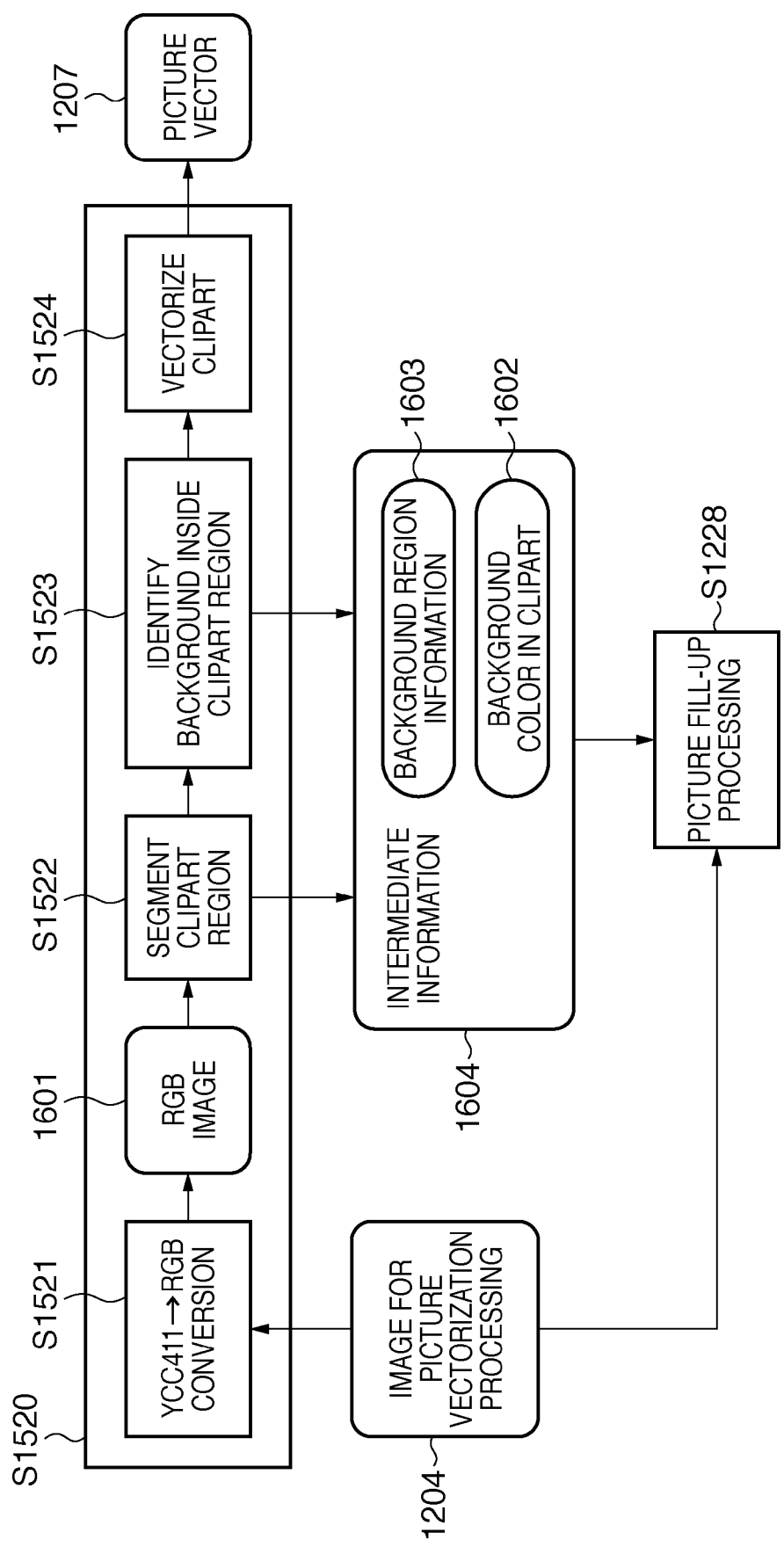
FIG. 16 is a diagram illustrating the details of vectorization processing S1520.

The details of S1520 will be described with reference to FIG. 16. The processing steps S1521 to S1524 in FIG. 16 indicate the details of vectorization processing S1520 shown in FIG. 15. Information 1601 to 1604 such as images is recorded in a work memory reserved for picture vectorization and fill-up.

High-resolution processing S1521 is processing for restoring an image in which at least one color component of the plurality of color components has a low resolution to an image having a resolution equal to that of the input image. In this embodiment, image 1204 for picture vectorization processing a Y:Cb:Cr=4:1:1 image. This image is converted to an RGB image having a resolution equal to that of the input image. That is, an RGB image 1601 is a high-resolution image obtained by the high-resolution conversion processing S1521.

Clipart region segmentation processing S1522 is processing for specifying a clipart region in the RGB image 1601 based upon the region information 1205 and segmenting this into regions on a per-color basis based upon the color feature of each of the pixels within the clipart region. That is, the clipart region segmentation processing S1522 subjects the pixels within the clipart region to clustering and is processing equivalent to that executed by the region segmentation unit 803 of the above-described embodiment.

Processing S1523 for identifying background inside a clipart region identifies a background portion and background color inside a clipart region based upon the region of every color segmented by the clipart region segmentation processing S1522 and the color neighboring the clipart region. The processing S1523 for identifying background inside a clipart region is processing equivalent to that executed by the background region specifying unit 804 of the above-described embodiment.

Clipart vectorization processing S1524 specifies a portion other than background (i.e., the portion of an object image constituting foreground) inside the clipart region based upon the result of identification by the processing S1523 for identifying background inside a clipart region and the result of region segmentation at the clipart region segmentation processing step S1522. The picture vector 1207 is generated by vectorizing the specified portion other than background.

Various information currently undergoing processing is held in the memory 1604 as intermediate information. Also held in the memory 1604 are background region information 1603, which has been obtained as the result of identification by the processing S1523 for identifying background inside a clipart region, and background color 1602 inside the clipart region. In addition, various information generated during the course of clipart vectorization processing is held in the memory 1604. The background region information 1603 and background color 1602 inside the clipart region are input information in processing S1228 for filling in a picture portion, described next.

Picture fill-up processing S1228 executes fill-up processing for a picture region (picture portion) inside the image 1204 for picture vectorization processing after processing at the text fill-up processing step S1226. The picture fill-up processing S1228 is processing executed by a fill-up processing method that differs depending upon whether the output result from the picture vectorization processing S1227 is a picture vector or rectangular photographic image. In a case where the picture region is a rectangular photographic image, the average value of surrounding pixels of the rectangular photographic image region is used to execute fill-up processing of the region corresponding to this rectangular photographic region in the image 1204 for picture vectorization processing after processing at the text fill-up processing step S1226.

On the other hand, in a case where picture vectorization has been performed by the picture vectorization processing S1227 (i.e., in the case of a clipart region), the picture fill-up processing S1228 executes fill-up processing by processing similar to that of FIG. 11 of the above-described embodiment. Thus, a false color is not produced at a boundary portion even in case of data whose resolution in a clipart region that has undergone picture vectorization differs from that in background outside a circumscribing rectangular region that contains the clipart region. The boundary portion is a boundary portion between an object to be vectorized and a background region, and a boundary portion between an object to be vectorized and a background region inside the circumscribing rectangle thereof. That is, even if the color-difference resolution of an image that is input to picture vectorization processing is made lower than resolution of the luminance component, it is possible to execute vectorization processing and fill-up processing without producing false color.

Thus, the picture fill-up processing S1228 generates a base image 1209 that has undergone fill-up of the picture region. That is, the base image 1209 is an image generated by execution of the text fill-up processing step S1226 and execution of the picture fill-up processing S1228 for the image 1204 for picture vectorization processing.

Figure 17:
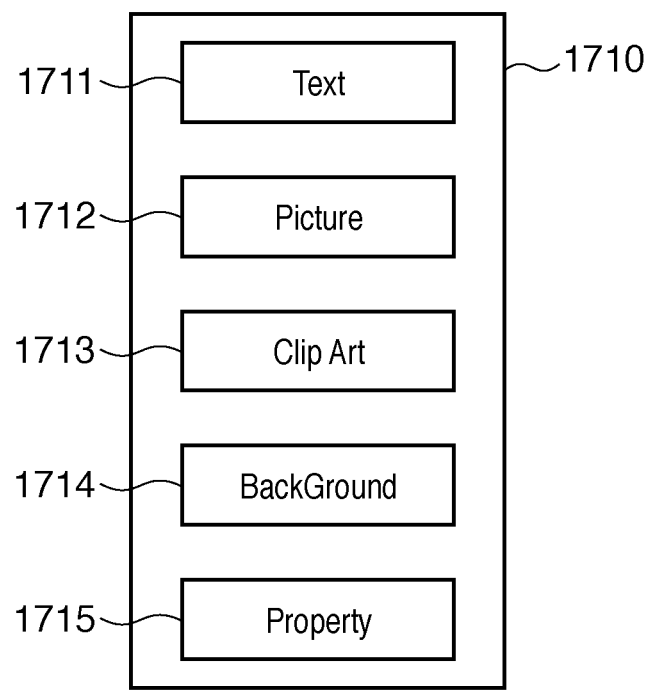
FIG. 17 is a diagram illustrating an example of page rendering information generated by processing for generating page rendering information.

Processing S1229 for generating page rendering information gathers together the data and region information generated by each of these processing steps. FIG. 17 illustrates an example of page rendering information 1210 generated by processing for generating page rendering information. Shown at 1710 in FIG. 17 is an example of the overall content of page rendering information 1210 generated by the processing S1229 for generating page rendering information. A text object 1711 holds position information of a region which the region analysis processing S1224 has judged to be text, and the text vector 1206 obtained by the vector conversion performed in the text vectorization step S1225. A photographic object 1712 holds the photographic image 1208 and position information of the region. A clipart object 1713 holds the picture vector 1207 of the clip art and the position information thereof. A base object 1714 holds the filled-in base image 1209 and position information. Property 1715 holds information (e.g., number of pages, page size, input-device information and time stamp, etc.) relating to the input data.

Electronic file generating processing S1230 converts the page rendering information 1210 to an electronic file 1211. In this embodiment, the page rendering information 1210 is converted to an electronic file 1211 capable of being reproduced and edited by a personal computer. An electronic document 2110 shown in FIG. 18 is an example of the electronic file 1211 produced in accordance with a virtual XML format created in order to describe this embodiment. Indicated at 2111 in FIG. 18 is an example of a description for rendering the base image data of the base object 1714 of FIG. 17 as one entire page. Indicated at 2112 is a description for rendering photographic image in the photographic object 1712 at a position designated by position information. Indicated at 2113 is a description for rendering a picture vector in the clipart object 1713 at a designated position in the page. Indicated at 2114 is a description for rendering a text vector in the text object 1711 at a designation position in the page.

The information described at 2111 to 2114 is rendered in order by the personal computer that has received the electronic document of FIG. 18. As a result, the background, photograph, picture vector and text vector are superimposed, thereby making it possible to reproduce a page image having an external appearance equal to that of the original document. Further, the descriptions at 2111 to 2114 can also be used as objects in editing applications.

It should be noted that FIG. 18 is only one example and descriptions may be created using other formats. For example, it is permissible to use a graphic page description such as PDF, XPS or SVG, or a page editing data description such as Office Open XML or Open Document Format.

The amount of memory required to be used in the image processing apparatus set forth above will now be described. Here a case where a color document image of size A4, resolution 600 dpi and 24 bits per pixel has been input will be taken as an example. In this example, the memory size necessary for the input image 1201 is about 100 MB. The memory size necessary for the region analysis image 1202 differs depending upon color distribution, etc., of the input image. However, if the entire page is expressed by two bits, then the required memory size will be about 2 MB in case of 300 dpi. The memory size for the image 1203 for text vectorization processing is about 33 MB in case of eight bits per pixel at 600 dpi. The memory size necessary for the image 1204 for picture vectorization processing is about 13 MB in case of 300 dpi for luminance and 150 dpi for color difference. By deleting the input image 1201 after the image for each type of processing is generated, the memory size of 100 MB that was required becomes a total 48 MB. Thus, the amount of memory required is reduced by about one-half.

With this embodiment, as described above, an input document image that contains a clipart region and a text region is converted to three images suited to respective ones of region separation processing, text vectorization processing and clipart vectorization processing. By inputting each image to the corresponding processing and performing electronification, electronic data having a high image quality and high reutilizability can be generated with a high processing accuracy while consumption of memory needed for image storage can be suppressed.

In addition, an image in which color-difference resolution has been made lower than luminance resolution is subjected to clipart-region vectorization processing, and fill-up processing appropriate for the same region is executed. As a result, it is possible to generate a base image without the occurrence of false color and without sacrificing image quality, and it is possible to generate high-quality electronic data while suppressing memory consumption.

Further, in the second embodiment, a text image and clipart are vectorized. However, it may be so arranged that line drawings (line art) and ruled lines in a table (frame) are converted to vector data as well. Vector conversion processing applied to line drawings (line art) and ruled lines can employ well-known techniques. For example, it will suffice to make the conversion to vector data based upon contour of line drawings or ruled lines in a manner similar to that of text vectorization processing described earlier. If a highly accurate conversion is desired in a case where a line drawing or ruled line is converted to vector data, it will suffice to make the conversion to vector data using the image 1203, which is for text vectorization processing, in a manner similar to that of the text image. It will suffice if the color information of the line drawing or ruled line is decided based upon the color information obtained by the region analysis processing S1224.

There are also cases where a line drawing (line art) is composed of a plurality of colors. In such cases it may be so arranged that the conversion is made to vector data by processing similar to that of the picture vectorization processing S1227 using the image 1204 for picture vectorization processing.

Modifications

Although embodiments have been described above in detail, it is possible for the invention to take on the form of a system, apparatus, method, program or storage medium (recording medium). More specifically, the present invention may be applied to a system constituted by a plurality of devices or to an apparatus comprising a single device.

Furthermore, there are cases where the object of the invention is attained also by supplying a software program (a program corresponding to the flowcharts shown in the drawings of the foregoing embodiments), which implements the functions of the foregoing embodiments, directly or remotely to a system or apparatus, reading the supplied program codes with a computer of the system or apparatus, and then executing the program codes.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, for example, object code, a program executed by an interpreter or script data supplied to an operating system, etc., does not matter.

Examples of recording media for supplying the program are a flexible disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the program can also be supplied by being downloaded to a recording medium such as a hard disk from a website on the Internet using a browser possessed by a client computer. That is, the website is accessed and the computer program per se of the present invention or an automatically installable compressed file is downloaded from the website. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the invention.

Further, the program of the present invention is encrypted, stored on a storage medium such as a CD-ROM and distributed to users. Users who meet certain requirements are allowed to download decryption key information from a website via the Internet. It is possible to run the encrypted program upon decrypting it using the key information, whereby the program is installed in the computer.

Further, the functions of the embodiment are implemented by having a computer execute a program that has been read. In addition, an operating system or the like running on the computer performs all or a part of the actual processing based upon the indications in the program. The functions of the embodiment can be implemented by this processing as well.

Furthermore, a program that has been read from a computer-readable recording medium is written to a memory provided on a function expansion board inserted into the computer or provided in a function expansion unit connected to the computer, after which the functions of the above-described embodiments are implemented. That is, a CPU or the like provided on the function expansion board or function expansion unit performs a part of or the entire actual processing based upon the designations in the program, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-167877, filed Jun. 26, 2008, and No. 2009-118040, filed May 14, 2009, which are hereby incorporated by reference herein in their entirety.

What is claimed is:

1. An image processing method comprising:
a generating step of generating, from a color image, a first image in which at least one of a plurality of color components has a resolution lower than that of the other color components;
a holding step of holding the first image, which has been generated at said generating step, as a base image;
an extracting step of extracting, from the color image, a rectangular region that includes an object image;
a specifying step of specifying a region of the object image and a region of a background image in the rectangular region that has been extracted at said extracting step; and
a fill-up step of executing fill-up processing of a region, which corresponds to the object image that has been specified at said specifying step, with regard to the base image;
wherein a first fill-up processing executed with the color of the base image for a boundary between the object image and the base image, and wherein said fill-up processing step executes a second fill-up processing with the color of the background image for a boundary between the object image and the background image.

2. An image processing apparatus comprising:
an image generating unit configured to generate, from a color image, a first image in which at least one of a plurality of color components has a resolution lower than that of the other color components;
a holding unit configured to hold the first image, which has been generated by said image generating unit, as a base image;
a region extracting unit configured to extract, from the color image, a rectangular region that includes an object image;
a specifying unit configured to specify a region of the object image and a region of a background image in the rectangular region that has been extracted by said region extracting unit; and
a fill-up unit configured to execute fill-up processing of a region, which corresponds to the object image that has been specified by said specifying unit, with regard to the base image;
wherein said fill-up processing unit executes a first fill-up processing with the color of the base image for a boundary between the object image and the base image, and wherein said fill-up processing unit executes a second fill-up processing with the color of the background image for a boundary between the object image and the background image.

3. The apparatus according to claim 2, wherein said fill-up processing unit executes the first fill-up processing with the color of the base image for the boundary between the object image and the base image, executes the second fill-up processing with the color of the background image for the boundary between the object image and the background image, and executes a third fill-up processing with the color of the background image for a region corresponding to the object image except said boundaries.

4. The apparatus according to claim 2, further comprising a resolution raising unit configured to raise the resolution of the base image;
wherein said specifying unit segments the rectangular area into a plurality of regions based upon color features of the image the resolution of which has been raised by said resolution raising unit, and specifies the region of the object image and the region of the background image based upon the plurality of regions obtained by segmentation.

5. The apparatus according to claim 2, further comprising a vectorization unit configured to vectorize the object image specified by said specifying unit; and
an output unit configured to output data that includes vector data of the object image that has been vectorized by said vectorization unit and data of the base image that has been subjected to fill-up processing by said fill-up processing unit.

6. The apparatus according to claim 2, wherein the object image is a clipart image and said region extracting unit extracts a rectangular area that includes the clipart image.

7. The apparatus according to claim 2, wherein said image generating unit lowers the resolution of at least one of a Cr color component and Cb color component in YCrCb color space with respect to the color image, thereby generating the first image in which the at least one of the Cr and Cb color components has the resolution lower than that of the Y color component.

8. The apparatus according to claim 2, further comprising:
a unit configured to lower the resolution of the color image, perform color quantization and generate a second image;
a unit configured to generate a third image that is based upon luminance information of the color image;
a region analyzing unit configured to subject the second image to region analysis processing;
a text vectorization unit configured to subject a region, which has been analyzed to be a text region by said region analyzing unit, to vectorization processing of a text image in the third image, thereby generating vector data of the text image; and
a text fill-up processing unit configured to subject the base image to fill-up processing of a region corresponding to the text image.

9. The apparatus according to claim 8, wherein the color image is deleted after the first, second and third images are generated.

10. A non-transitory computer-readable storage medium storing a program that, when executed by a computer, causes the computer to execute an image processing method, the method comprising:
a generating step of generating, from a color image, a first image in which at least one of a plurality of color components has a resolution lower than that of the other color components;

a holding step of holding the first image, which has been generated at said generating step, as a base image;

an extracting step of extracting, from the color image, a rectangular region that includes an object image;

a specifying step of specifying a region of the object image and a region of a background image in the rectangular region that has been extracted at said extracting step; and a fill-up step of executing fill-up processing of a region, which corresponds to the object image that has been specified at said specifying step, with regard to the base image;

wherein a first fill-up processing executed with the color of the base image for a boundary between the object image and the base image, and wherein said fill-up processing step executes a second fill-up processing with the color of the background image for a boundary between the object image and the background image.

* * * * *